United States Patent
Davis et al.

(10) Patent No.: US 10,048,948 B2
(45) Date of Patent: Aug. 14, 2018

(54) OPTIMIZED RETRIEVAL OF CUSTOM STRING RESOURCES

(71) Applicant: Oracle International Corporation, Redwood Shores, CA (US)

(72) Inventors: Edmund Alexander Davis, San Mateo, CA (US); Shaun Thomas Logan, Melrose, MA (US); Duncan Richard Mills, Winchester (GB)

(73) Assignee: Oracle International Corporation, Redwood Shores, CA (US)

( * ) Notice: Subject to any disclaimer, the term of this patent is extended or adjusted under 35 U.S.C. 154(b) by 36 days.

(21) Appl. No.: 15/203,247

(22) Filed: Jul. 6, 2016

(65) Prior Publication Data

US 2017/0010870 A1    Jan. 12, 2017

Related U.S. Application Data

(60) Provisional application No. 62/188,801, filed on Jul. 6, 2015.

(51) Int. Cl.
*G06F 9/44* (2018.01)
*G06F 8/36* (2018.01)
*G06F 8/38* (2018.01)

(52) U.S. Cl.
CPC . *G06F 8/36* (2013.01); *G06F 8/38* (2013.01)

(58) Field of Classification Search
USPC ................................ 717/106–109, 120–123
See application file for complete search history.

(56) References Cited

U.S. PATENT DOCUMENTS

| | | |
|---|---|---|
| 6,230,318 B1 | 5/2001 | Halstead et al. |
| 6,266,058 B1 | 7/2001 | Meyer |
| 7,480,921 B1 | 1/2009 | Vigesaa et al. |
| 7,529,763 B2 | 5/2009 | Hulse et al. |
| 7,543,238 B2 | 6/2009 | Alcazar et al. |
| 7,546,602 B2 | 6/2009 | Hejlsberg et al. |
| 7,917,888 B2 | 3/2011 | Chong et al. |
| 8,099,710 B2 | 1/2012 | Hill et al. |
| 8,296,352 B2 | 10/2012 | Mazzaferri |
| 8,417,728 B1 | 4/2013 | Anders et al. |
| 8,489,640 B2 | 7/2013 | Schlarb et al. |

(Continued)

OTHER PUBLICATIONS

Saleh et al., "Pro JSF and HTML5—Building Rich Internet Components", Second Edition, 2013, Apress, pp. 1-384.*

(Continued)

*Primary Examiner* — Ted T Vo
(74) *Attorney, Agent, or Firm* — Kilpatrick Townsend & Stockton LLP

(57) ABSTRACT

In various embodiments, methods, systems, and non-transitory computer-readable media are disclosed that allow a desktop integration framework to optimize retrieval of custom string resources from resource bundles hosted by server computer systems. A client computer that uses a document as a user interface to a web-server application hosted by a server-computer system can determine which custom string resources are to be utilized in the document. The client computer system can request only the custom string resources that are determined to be utilized in the document from the server-computer system in a single request thereby optimizing retrieval without requesting entire resource bundles.

18 Claims, 12 Drawing Sheets

(56) References Cited

U.S. PATENT DOCUMENTS

| | | |
|---|---|---|
| 9,524,287 B2 | 12/2016 | Davis et al. |
| 2003/0135558 A1 | 7/2003 | Bellotti et al. |
| 2004/0046789 A1 | 3/2004 | Inanoria |
| 2005/0038629 A1 | 2/2005 | Amaru et al. |
| 2005/0086360 A1 | 4/2005 | Mamou et al. |
| 2005/0183059 A1 | 8/2005 | Loksh et al. |
| 2007/0219956 A1 | 9/2007 | Milton |
| 2008/0222192 A1 | 9/2008 | Hughes |
| 2008/0222238 A1 | 9/2008 | Ivanov et al. |
| 2008/0256554 A1 | 10/2008 | Yassin |
| 2009/0013244 A1 | 1/2009 | Cudich et al. |
| 2009/0019383 A1 | 1/2009 | Riley et al. |
| 2009/0064001 A1 | 3/2009 | Robbins |
| 2009/0171999 A1 | 7/2009 | McColl et al. |
| 2009/0183072 A1 | 7/2009 | Stephenson et al. |
| 2011/0087708 A1 | 4/2011 | Teichmann |
| 2011/0107196 A1 | 5/2011 | Foster |
| 2011/0219321 A1 | 9/2011 | Gonzalez Veron et al. |
| 2012/0036125 A1 | 2/2012 | Al-Kofahi et al. |
| 2012/0110515 A1 | 5/2012 | Abramoff et al. |
| 2012/0246170 A1 | 9/2012 | Iantorno et al. |
| 2013/0159832 A1 | 6/2013 | Ingargiola et al. |
| 2014/0281943 A1 | 9/2014 | Prilepov et al. |
| 2015/0089340 A1 | 3/2015 | Logan et al. |
| 2015/0089341 A1 | 3/2015 | Davis et al. |
| 2015/0089342 A1 | 3/2015 | Davis et al. |
| 2015/0089350 A1 | 3/2015 | Davis et al. |
| 2015/0089351 A1 | 3/2015 | Logan et al. |
| 2016/0004668 A1 | 1/2016 | Rowles et al. |
| 2016/0055374 A1 | 2/2016 | Zhang et al. |
| 2016/0085735 A1 | 3/2016 | Davis et al. |
| 2017/0083503 A1 | 3/2017 | Davis et al. |
| 2017/0192944 A1 | 7/2017 | Davis et al. |

OTHER PUBLICATIONS

Giulio Zambon, "Beginning JSP, JSF and Tomcat—Java Web Development", 2012, Apress, Chapters 4, 5, 6, and 7, pp. 79-229.*

U.S. Appl. No. 14/333,105, Final Office Action dated Jan. 25, 2017, 28 pages.

Grossman et al., ToolClips: An Investigaion of Contextual Video Assistance for Functionality Understanding, CHI 2010: Looking with Video, Apr. 10-15, 2010, pp. 1515-1524.

U.S. Appl. No. 14/333,105, Non-Final Office Action dated Jun. 30. 2016, 22 pages.

U.S. Appl. No. 14/333,176, Final Office Action dated Jul. 8, 2016, 18 pages.

U.S. Appl. No. 14/333,176, Non-Final Office Action dated Dec. 21, 2015, 16 pages.

U.S. Appl. No. 14/333,205, Final Office Acton dated Jul. 8, 2016, 17 pages.

U.S. Appl. No. 14/333,205, Non-Final Office Action dated Jan. 13, 2016, 15 pages.

U.S. Appl. No. 14/333,238, Non-Final Office Action dated Mar. 17, 2016, 14 pages.

U.S. Appl. No. 14/333,238, Notice of Allowance dated Aug. 16, 2016, 11 pages.

U.S. Appl. No. 14/333,105, Notice of Allowance dated Jun. 2, 2017, 8 pages.

U.S. Appl. No. 14/753,459, Non-Final Office Action dated Jun. 19, 2017, 6 pages.

"Non-Final Office Action" issued in U.S. Appl. No. 14/861,792, dated Sep. 22, 2017, 9 pages.

U.S. Appl. No. 14/333,146, Notice of Allowance dated May 3, 2017, 20 pages.

U.S. Appl. No. 14/333,146, Non-Final Office Action dated Oct. 19, 2016, 26 pages.

U.S. Appl. No. 14/333,176, Advisory Action dated Oct. 18, 2016, 3 pages.

U.S. Appl. No. 14/333,176, Notice of Allowance dated Dec. 2, 2016, 11 pages.

U.S. Appl. No. 14/333,205, Advisory Action dated Oct. 18, 2016, 3 pages.

U.S. Appl. No. 14/333,205, Notice of Allowance dated Dec. 2, 2016, 11 pages.

"Non-Final Office Action" issued in U.S. Appl. No. 15/368,421, dated Oct. 5, 2017, 14 pages.

"Notice of Allowance" issued in U.S. Appl. No. 14/753,459, dated Dec. 29, 2017, 8 pages.

"Final Office Action" issued in U.S. Appl. No. 14/861,792, dated Mar. 8, 2018, 17 pages.

* cited by examiner

| | 810 ↙ | ↙ 820 | ↙ 830 |
|---|---|---|---|
| | RESOURCE BUNDLE ID A | RESOURCE KEY A1 | RESOURCE ITEM A1 |
| | | RESOURCE KEY A2 | RESOURCE ITEM A2 |
| | RESOURCE BUNDLE ID B | RESOURCE KEY B | RESOURCE ITEM B |
| | ... | | |
| | RESOURCE BUNDLE ID N | RESOURCE KEY N | RESOURCE ITEM N |

FIG. 8

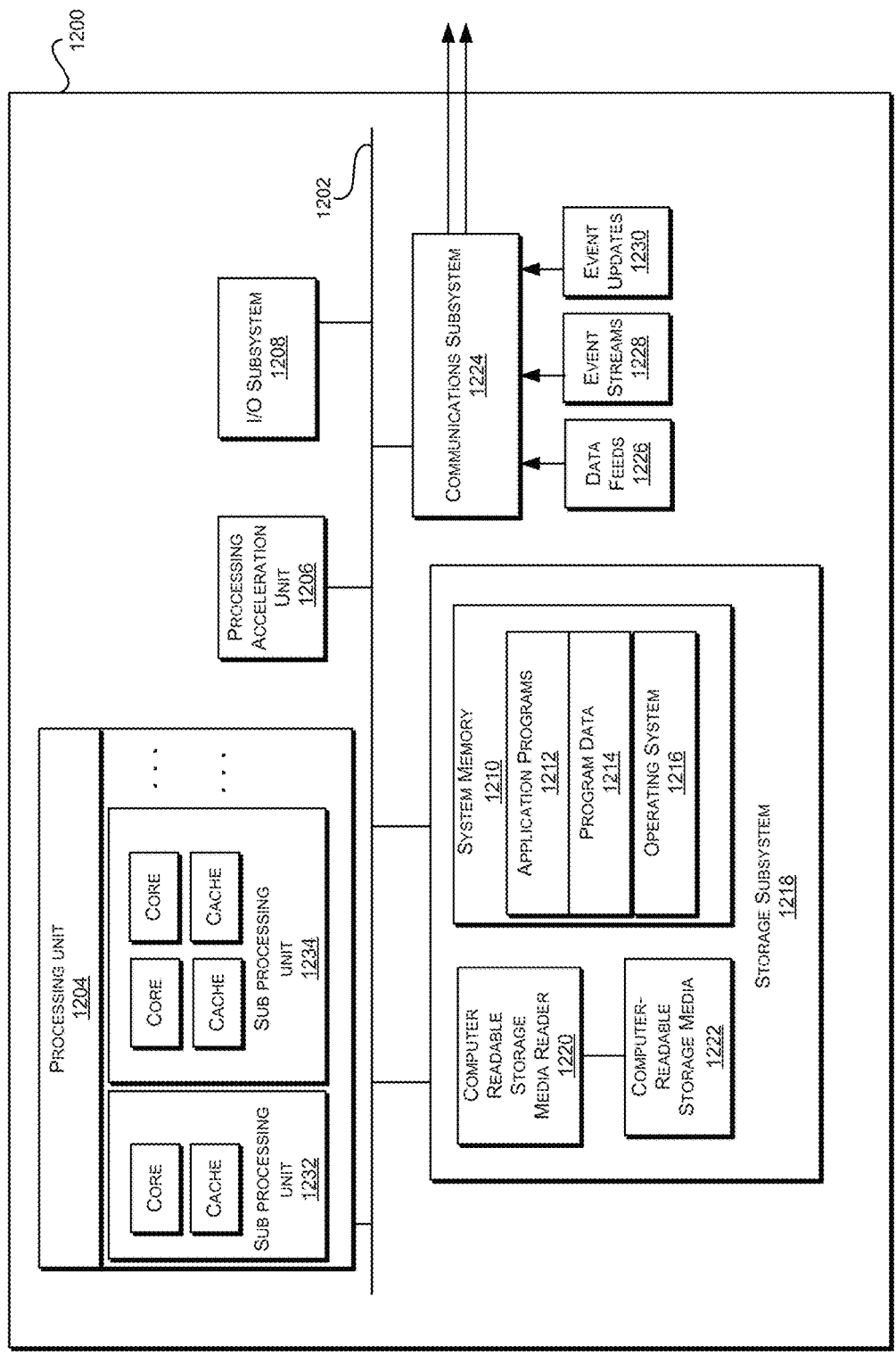

OPTIMIZED RETRIEVAL OF CUSTOM STRING RESOURCES

CROSS-REFERENCE TO RELATED APPLICATIONS

The present application is a non-provisional application of, and claims the benefit and priority under 35 U.S.C. 119(e) of U.S. Provisional Application No. 62/188,801, filed Jul. 6, 2015, entitled "OPTIMIZED RETRIEVAL OF CUSTOM STRING RESOURCES," the entire contents of which are incorporated herein by reference for all purposes.

BACKGROUND

An application refers to a software program, which on execution performs specific desired tasks. In general, several applications are executed in a run-time environment containing one or more of operating systems, virtual machines (e.g., supporting Java™ programming language), device drivers, etc., as is well known in the relevant arts.

Developers often use Application Development Frameworks (ADFs) (which are by themselves applications) for implementing and/or developing desired applications. An ADF provides a set of pre-defined code/data modules that can be directly/indirectly used in the development of an application. An ADF may also provide tools such as an integrated development environment (IDE), code generators, debuggers, etc. which facilitates a developer in coding/implementing the desired logic of the application in a faster/simpler manner.

In general, an ADF simplifies development of applications by providing re-usable components and integrated development environments, which application developers can use to define user interfaces and application logic by, for example, selecting components to perform desired tasks and defining the appearance, behavior, and interactions of the selected components. Some ADFs are based on a model-view-controller design pattern that promotes loose coupling and easier application development and maintenance. Oracle® Application Development Framework provided by Oracle Corporation is one example of an ADF that utilizes this design pattern.

Oracle® ADF includes libraries of standards-based Java Server Faces (JSF) components with built-in HTML5 and Ajax functionality. With these components, web deployed user interfaces can be developed with a level of functionality and interactivity previously reserved for thick-client applications. The components offer data interaction, data visualization, and encapsulated browser side operations in a set of easy to use components that makes rich client application development easier than ever. Oracle® ADF further provides a data-binding framework that simplifies binding UI to business services through a simple drag and drop operations in the IDE. This is done while still keeping the independence of the business service from consuming interfaces. With the framework, the UI developer is insulated from the underlying implementation of the business service layer. This makes the process of building the UI truly decoupled from the implementation of the business service layer, better positioning the application for implementation in a service-oriented architecture.

Accordingly, what is desired is to solve problems relating to building application user interfaces using application development frameworks, some of which may be discussed herein. Additionally, what is desired is to reduce drawbacks relating to building user interfaces using application development frameworks, some of which may be discussed herein.

BRIEF SUMMARY

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In various embodiments, methods, systems, and non-transitory computer-readable media are disclosed that allow developers working within desktop applications to create application-specific documents that integrate with web-based applications. Using a desktop integration framework, a developer can design documents having components that provide user interfaces to data associated with data models of the web-based applications. In one aspect, how a component looks and is configured can be dynamically driven at runtime based on aspects of its underlying data model.

In one embodiment, a method for creating documents of desktop applications that act as user interfaces for web-based applications includes creating contents of a document in a native application format associated with a first application. A user interface element is associated with a portion of the contents of the document. The user interface element is a component of a second application and provides a link between the portion of the contents of the document and data associated with data models provided by web-based applications in communication with the second application. The user interface element is mapped to one or more data models provided by a web-based application. The user interface element contributes at least a portion of data associated with the one or more data models provided by the web-based application to a user interface within the first application. How the user interface element contributes to the user interface is driven at runtime based on the one or more data models. Metadata associated with the document is generated based on the association of the user interface element with the portion of the contents of the document and the mapping of the user interface element to the one or more data models provided by the web-based application.

In another embodiment, a method is provided for and implemented at a client computer having a processor and a memory, the memory storing a document and document metadata specifying one or more user interface components associated with one or more attributes of one or more data models provided by a web-based application hosted by a server computer. The method includes determining, by the processor, one or more resource bundles specified by the document metadata, wherein each of the one or more resource bundles comprises a plurality of resource items hosted by a server computer; determining, by the processor, one or more resource items in each of the determined one or more resource bundles specified by the document metadata as being utilized by the client computer to render the one or more user interface components; generating, by the processor, a request that includes a reference to each of the determined one or more resource bundles and a resource key to each of the determined one or more resource items in each of the determined one or more resource bundles; sending, by the processor, the request to the server computer; receiving, by the processor, a response to the request from the server computer that includes each of the determined one or more resource items in each of the determined resource bundles; and rendering, by the processor, the one or more user interface components using each of the one or more resource items received from the server computer.

Optionally, the generating the request comprises generating a single request with a single data structure comprising each of the determined one or more resource bundles and the resource key to each of the determined one or more resource items in each of the determined one or more resource bundles.

In additional or alternative embodiments, the method further comprises rendering, by the processor, the document as a user interface to the web-based application using the document metadata and the one or more resource items received from the server computer.

Optionally, the determining the one or more resource bundles and the one or more resource items comprises analyzing, by the processor, content of the one or more user interface components for one or more references to the one or more resource items contained in the one or more resource bundles. The one or more references to the one or more resource items may be string resources or programming tokens embedded into the document or the document metadata.

In additional or alternative embodiments, the response includes a data structure for each of the determined one or more resource bundles, and each data structure includes a resource key and a corresponding resource item for each of the determined one or more resource items in the resource bundle; and the method further comprises rendering, by the processor, the document as a user interface to the web-based application using the document metadata and each resource item received from the server computer.

In another embodiment, non-transitory computer-readable medium storing program code is provided for that when executed by a processor of a client computer cause the processor to perform a method comprising determining, by the processor, one or more resource bundles specified by document metadata of a document comprising one or more user interface components, wherein each of the one or more resource bundles comprises a plurality of resource items hosted by a server computer; determining, by the processor, one or more resource items in each of the determined one or more resource bundles specified by the document metadata as being utilized by the client computer to render the one or more user interface components of the document; generating, by the processor, a request that includes a reference to each of the determined one or more resource bundles and a resource key to each of the determined one or more resource items in each of the determined one or more resource bundles; sending, by the processor, the request to the server computer; receiving, by the processor, a response to the request from the server computer that includes each of the determined one or more resource items in each of the determined resource bundles; and rendering, by the processor, the one or more user interface components using each of the one or more resource items received from the server computer.

In another embodiment, a method is provided for and implemented at a server computer having a processor and a memory, the memory storing a document, document metadata specifying one or more user interface components associated with one or more attributes of one or more data models provided by a web-based application hosted by the server computer, and one or more resource bundles hosted by the server computer. The method includes receiving, by the processor, a request for the document from a client computer; determining, by processor, one or more resource bundles specified by the document metadata, wherein each of the one or more resource bundles comprises a plurality of resource items hosted by the server computer; determining, by the processor, one or more resource items in each of the determined one or more resource bundles specified by the document metadata as being utilized by the client computer to render the one or more user interface components; generating, by the processor, a resource map that includes a resource key and a corresponding resource item for each of the determined one or more resource items in the determined one or more resource bundles; and sending, by the processor, the resource map to the client computer thereby enabling the client computer to render the document as a user interface to a web-based application using the document metadata and each resource item received from the server computer.

Optionally, the determining the one or more resource bundles and the one or more resource items comprises analyzing, by the processor, content of the one or more user interface components for one or more references to the one or more resource items contained in the one or more resource bundles.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of the claims, any of the presently described embodiments and/or examples, or the presently understood best mode of any innovations presented within this disclosure.

FIG. 8 is a block diagram of an optimized resource response generated by the server component of the desktop integration framework of FIG. 2 in one embodiment.

FIG. 12 illustrates an exemplary computer system, in which various embodiments may be implemented.

DETAILED DESCRIPTION

Figure 1:
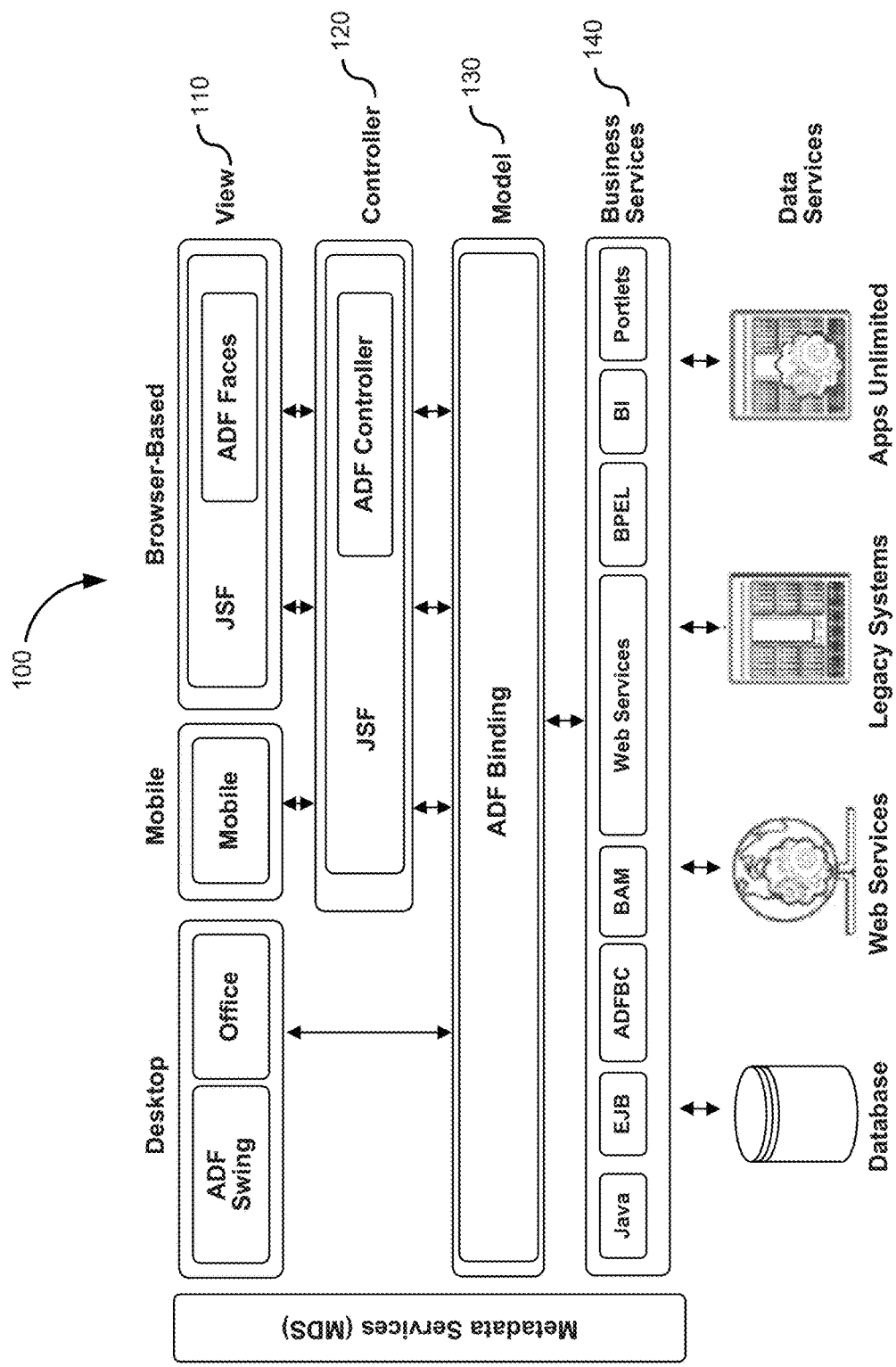
FIG. 1 is a block diagram illustrating an application development framework (ADF) in one embodiment.

In the following description, for the purposes of explanation, specific details are set forth in order to provide a thorough understanding of the various embodiments discussed herein. However, it will be apparent that the various embodiments may be practiced without these specific details. The figures and description are not intended to be restrictive.

Introduction

An application developer utilizing a design mode of an ADF to work within an application to create a document, as described herein, typically has the option to configure one or more resource bundles comprising a plurality of resource items for each document such as a workbook. When a document is first initialized at runtime, a client conventionally sends a request (per resource bundle) to a server and retrieves the entire resource bundle including all keys (e.g., tokens) and values (e.g., resource items) regardless of whether a given key-value pair was used in that particular document. The conventional assumption was that the one or more resource bundles would be generally dedicated to the document's use case. However, in actual practice, application developers create very large, shared resource bundles that contain thousands of resource items, most of which are never used in a given document. Thus, retrieving these large lists of resource items multiple times using multiple requests can negatively impact performance of a computing system.

For example, in order to provide a localized (translated) or internationalized user interface, UI components of user interfaces are typically specified with string resources (rather than literal text strings) that are substituted at runtime using the current user's language/culture settings. The string resources provide the text strings for the UI components with optional text styling and formatting. In the case of client-server applications, clients may request long lists of translated text strings from the servers on demand, and then substitute the string resources with the translated text strings at runtime. Thus, fetching the long lists of translated text strings multiple times using multiple requests can impact performance negatively of a computing system.

The growth of cloud or distributed computing over time has put a premium on bandwidth and increased average network latency. The premium on bandwidth and increased average network latency means that fewer requests and/or smaller requests for resource items is a preferred solution in a cloud or distributed computing environment. On the other hand, client computational power has grown over the same period time, and this growth has reduced the cost of doing client-side analysis. The combination of these factors has driven the conception of the various embodiments discussed herein, which relates generally to improving performance by creating fewer and/or smaller requests for resource items based on the optimized retrieval of custom string resources from resource bundles hosted by server computer systems. The fewer and/or smaller requests for resource items results in lower network traffic as well as overall lower computational burden of the client side and the server side.

In various embodiments, in order to overcome the impact on performance that the multiple server requests and large responses with unused key-value pairs creates, systems and techniques are provide for analyzing a document and/or document metadata to construct a list of custom key-value pairs actually used in the document. Thereafter, the key-value pairs are retrieved and cached from the server. The retrieval of the key-value pairs is coalesced into a single server request.

For example, desktop integration framework configured in accordance with aspects of the various embodiments discussed herein allows an application developer to include UI components in document wherein the process of analyzing which translated text strings will be used by the target UI components is optimized. In one aspect, a pared down list of strings from one or more required resources can be combined into a single request. In contrast to where entire lists were retrieved from the server in multiple requests, various embodiments analyze a user interface's specification in order to make a "smart" request to the server. Thus, optimizing retrieval of custom string resources in desktop integration framework allows the use of resource bundles that tend to be large while still being shared among various user interfaces such that a given user interface only uses a subset of resource items from the resource bundles. A user interface's specification can be analyzed to reveal the lists of resource items actually needed, and because each server request has a performance overhead, the number of server requests can be reduced While some embodiments have been disclosed herein with respect to ADF desktop integration and resources used for localized purposes, this is not intended to be restrictive. In addition to ADF Desktop integration and resources used for localized purposes, the teachings disclosed herein can also be applied to other domains. For example, a JavaScript-based web application (entirely unrelated to ADF Desktop Integration) may apply the same techniques to localization, e.g., fetching only the values for the keys actually used in the fewest requests possible. Likewise, a given client program (regardless of the technology) can optimize its requests to a given server for any kind of arbitrary "resource" (i.e., not just localized strings). For example, a JavaScript-based program may optimize the requests for JavaScript code in accordance with aspects of the various embodiments described herein.

Application Development Framework (ADF)

Java EE is a standard, robust, scalable, and secure platform that forms the basis for many of today's enterprise applications. Java EE provides a set of specifications for building multi-tier applications using the Java language. In the past, there was a direct correlation between the robust nature of an application to the complexity required to achieve it. However, with the advent of ADFs, such as Oracle® ADF, the implementation of extremely rich Java EE applications can be provided by adhering to standard patterns and practices with greatly reduced effort.

With the increased need for organizations to build composite applications that utilize Service Oriented Architecture (SOA) principles, developers are forced to create applications that are extremely agile. Implementing these best practices in agile applications usually involves writing a significant amount of infrastructure code, adding another obstacle for developers building their first Java EE application. In addition to providing robust, performant, and maintainable applications—Oracle® ADF provides the infrastructure code to implement agile SOA based applications thereby removing the effort involved in an organization "rolling their own."

Oracle® ADF further provides a visual and declarative approach to Java EE development through the Oracle® JDeveloper 11 g development tool. Oracle® ADF implements the Model-View-Controller design pattern and offers an integrated solution that covers all the layers of this architecture with solution to such areas as Object/Relational mapping, data persistence, reusable controller layer, rich Web user interface framework, data binding to UI, security and customization. Extending beyond the core Web based MVC approach, ADF also integrates with the Oracle® SOA and WebCenter Portal frameworks simplifying the creation of complete composite applications.

For example, Oracle® ADF makes it easy to develop agile applications that expose data as services by coupling a service interface to the built-in business services in ADF. This separation of business service implementation details is performed in Oracle® ADF via metadata. Use of this metadata-driven architecture enables application developers to focus on the business logic and user experience, rather than the details of how services are accessed.

Oracle® ADF stores the implementation details of these services in metadata in the ADF Model layer. This enables developers to exchange services without modifying the user interface, making the application extremely agile. Additionally, the developer creating the user interface does not need to bother with business service access details. Instead, developers can focus on developing the application interface and interaction logic. Creating the user experience can be as simple as dragging-and-dropping the desired business services onto a visual page designer and indicating what type of component should represent that data.

FIG. 1 is a block diagram illustrating application development framework (ADF) 100 in one embodiment. FIG. 1 is a simplified illustration of a system that may incorporate various embodiments presented within this disclosure. One of ordinary skill in the art may recognize through this disclosure and the teachings presented herein other variations, modifications, and/or alternatives to those embodiments or implementations illustrated in the figures.

ADF 100 may be embodied as Oracle® ADF in one example. Accordingly, ADF 100 is based on a Model-View-Controller (MVC) design pattern. An MVC application is separated into: 1) a model layer that handles interaction with data-sources and runs the business logic, 2) a view layer that handles the application user interface, and 3) a controller that manages the application flow and acts as the interface between the Model and the View layers. Separating applications into these three layers simplifies maintenance and reuse of components across applications. The independence of each layer from the others results in a loosely coupled, Service Oriented Architecture (SOA).

In this embodiment, modules forming an enterprise application are shown as being within ADF 100 to represent that the modules are developed using ADF and then executed within the context of ADF 100. For conciseness, the various internal details of ADF are not shown assuming that the application is developed using the JAVA programming language and Oracle® ADF available as part of JDeveloper, a development tool available from Oracle Corporation. However, the features of the various embodiments described below may be implemented using any desired combination of programming language and application development framework as will be apparent to one skilled in the relevant arts by reading the disclosure provided herein.

In various embodiments, the application is developed in the form of multiple layers, each layer containing code modules/files implementing desired logic according to pre-defined specification. Thus, in one embodiment, ADF 100 enables the application to be developed as four layers: view layer 110 containing code modules/files that provide the user interface of the application, controller layer 120 containing code modules that control the flow of the application, model layer 130 containing data/code modules that provide an abstraction layer for the underlying data, and business services layer 140 containing code modules that provide access to data from various sources and handles business logic.

Oracle® ADF lets developers choose the technology they prefer to use when implementing each of the layers. FIG. 1 shows various options available for developers when building Oracle® ADF applications. The glue that integrates the various components of Java EE applications and makes development so flexible is the Oracle® ADF model layer 130. EJB, Web Services, JavaBeans, JPA/EclipseLink/TopLink objects, and many others can all be used as Business Services for the Oracle® ADF Model. View layers can include Web based interfaces implemented with JSF, Desktop Swing applications and MS Office front ends, as well as interfaces for mobile devices.

It may be appreciated that the development of the application using such a layered approach often simplifies maintenance and reuse of components/code modules across various applications. Further, the independence of each layer from the other layers results in a loosely coupled service oriented architecture (SOA), which may be desirable when deploying the developed business/enterprise application on multiple/different systems.

In one aspect, view layer 110 represents the user interface of the application being developed. View layer 110 is shown with desktop, mobile, and browser-based views, each of which provides all or a portion of the user interface and is accessible in a variety of manners corresponding to view type. For example, web pages may be sent by the application in response to receiving client requests containing corresponding URLs. The web pages may then be displayed by a browser on a display unit (not shown) associated with a requesting client system, thereby enabling users of the requesting client system to interact with the enterprise application. Oracle® ADF support multi-channel access to business services allowing reuse of business services and access from a Web client, a client-server swing desktop-based application, Microsoft Excel spreadsheets, mobile devices such as a smart-phone, or the like.

The code files/modules forming the view layer (such as web pages) may be implemented using one or more of hypertext markup language (HTML), Java server pages (JSP), and Java Server Faces (JSF). Alternatively, the user interface may be implemented using Java components such as Swing, and/or extensible markup language (XML). As further noted, the user interface may leverage a user's experience and familiarity with desktop applications, such as Word and Excel by Microsoft.

As noted above, the relevant user-developed code/data modules are provided in each of the layers. However, each layer typically contains other pre-defined code/data modules provided by ADF 100. Some of the pre-defined modules may be used during development, for example, as templates for developing the web pages, for including desired functionality in the developed code etc. Other pre-defined modules (such as a URL rewriting module) may be deployed along with the developed application and may provide additional functionalities (mapping of requested URLs to internal names) to the user during execution of the enterprise application.

Controller layer 120 contains code modules/files that control the flow of the application. Each controller object contains software instructions and/or data implemented according to a desired manner of presenting information in view layer 110. The desired manner may include the specific web pages to be displayed when links in another web page are clicked/selected by the user, the page to be displayed when errors occur during execution, indicating the specific data to be stored/retrieved, etc.

In one aspect, controller layer 120 manages the applications flow and handles user input. For example, when a Search button is clicked on a page, the controller determines what action to perform (do a search) and where to navigate to (the results page). There are two controller options for web-based applications in JDeveloper: the standard JSF controller or the ADF Controller that extends the JSF controller functionality. Whichever controller is used, application flow is typically designed by laying out pages and navigation rules on a diagram. An application's flow can be broken into smaller, reusable task flows; include non-visual components such as method calls and decision points in a flow; and create "page fragment" flows that run inside a region of a single containing page.

The code modules/files forming controller layer 120 are often implemented as Java servlets receiving the client requests and sending desired web pages as corresponding responses. Controller objects may also be implemented, for example, as Apache Jakarta Struts controllers or according to the JSF standard.

Model layer 130 contains data/code modules that connect various business services to the objects that use them in the other layers, such as to the controller objects discussed above or directly to desktop applications as shown. Each abstract data objects of model layer 130 provides a corresponding interface that can be used to access any type of business service, executing in underlying business service layer 140. The data objects may abstract the business service implementation details of a service from a client and/or expose data control methods/attributes to view components, providing a separation of the view and data layers.

In one aspect, model layer 130 consists of two components, data controls and data bindings, which utilize metadata files to define the interface. Data controls abstract the business service implementation details from clients. Data bindings expose data control methods and attributes to UI components, providing a clean separation of the view and model. Due to the metadata architecture of the model layer, developers get the same development experience when binding any type of Business Service layer implementation to the View and Controller layers.

Oracle® ADF emphasizes the use of the declarative programming paradigm throughout the development process to allow users to focus on the logic of application creation without having to get into implementation details. At a high level, the development process for a Fusion web application usually involves creating an application workspace. Using a wizard, libraries and configuration needed for technologies selected by a developer are automatically added and an application is structured into projects with packages and directories.

By modeling database objects, an online database or offline replica of any database can be created, definitions edited, and schemas updated. Using a UML modeler, use cases can then be created for the application. Application control and navigation can also be designed. Diagrammers can be used to visually determine the flow of application control and navigation. Then, an underlying XML file describing the flow can be automatically created. A resource library can be used to allow a developer to view and use imported libraries by simply dragging and dropping them into the application. From database tables, entity objects can be created using wizards or dialogs. From those entity objects, view objects are created to be used by pages in the application. Validation rules and other types of business logic can be implemented.

In this example, business services layer 140 manages interaction with a data persistence layer. It provides such services as data persistence, object/relational mapping, transaction management, and business logic execution. The Business Services layer in Oracle® ADF can be implemented in any of the following options: As simple Java classes, EJB, Web services, JPA objects, and Oracle® ADF Business Components. In addition, data can be consumed directly from files (XML or CSV) as well as REST.

Thus, each business service manages interaction with a corresponding data persistence layer, and also provides such services as object/relational mapping, transaction management, business logic execution, etc. The business services layer may be implemented using one or more of simple Java classes, Enterprise Java Beans, web services, etc.

Business components represent a business service implemented using, for example, Oracle® ADF Business Components, to provide interaction with databases, web services, legacy systems, application servers, and the like. In one embodiment, business components of business services layer 140 contain a mixture of application modules, view/query objects, and entity objects, which cooperate to provide the business service implementation. An application module can be a transactional component/code module that UI clients communicate with for working with application/transaction data. The application module may provide an updatable data model and also procedures/functions (commonly referred to as service methods) related to user transactions.

An entity object may represent a corresponding row in a database table and simplifies the manipulation (update, deletion, etc.) of the data stored in the corresponding row. An entity object often encapsulates business logic for the corresponding row to ensure that the desired business rules are consistently enforced. An entity object may also be associated with other entity objects to reflect relationships existing between rows stored in the underlying database.

Desktop Integration

ADF Desktop Integration (ADFdi) extends the Oracle® Application Development Framework into the world of desktop applications like Microsoft Excel. Application developers can rapidly develop integrated documents, such as spreadsheets and documents of other desktop-based applications, to allow users to access and edit critical business data. This framework integrates seamlessly with each web application's security and business logic infrastructure. It also allows end users to edit their data without a live connection to the network. Once reconnected, ADF Desktop Integration can transparently upload and validate all user changes against the application's backend. Thus, ADF Desktop Integration allows developers to extend functionality provided by web-based applications to desktop applications.

End users may also prefer ADF Desktop Integration because it provides a familiar user interface in the user's preferred desktop application to undertake information management tasks, such as performing complex calculations or uploading a large amount of data, easily and seamlessly.

Figure 2:
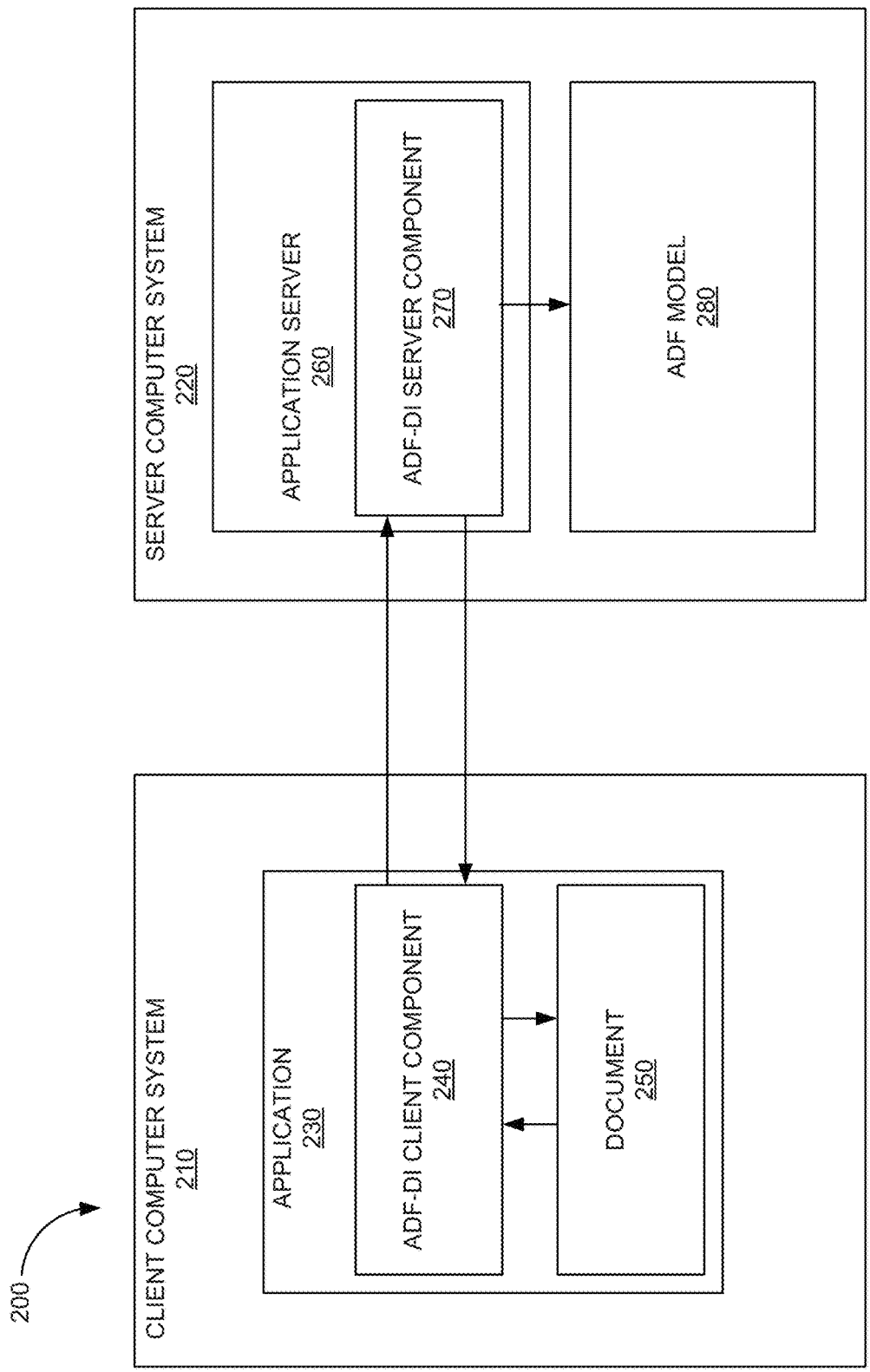
FIG. 2 is a block diagram illustrating a desktop integration framework for ADF of FIG. 1 in one embodiment.

FIG. 2 is a block diagram illustrating a desktop integration framework 200 for ADF 100 of FIG. 1 in one embodiment. Desktop integration framework 200 may incorporate various embodiments. One of ordinary skill in the art may recognize through this disclosure and the teachings presented herein other variations, modifications, and/or alternatives to those embodiments or implementations illustrated in the figures.

In this example, desktop integration framework 200 includes client computer system 210 and server computer system 220. Client computer system 210 is representative of hardware and/or software elements configured to provide access to and/or host application 230. Client computer system 210 may be embodied as a personal computer system, a laptop, a tablet, a mobile device, and the like. Client computer system 210 may include one or more operating systems, applications, browsers, and the like executing on one or more computers. Client computer system 210 is merely illustrative of an embodiment disclosed herein. One of ordinary skill in the art may recognize through this disclosure and the teachings presented herein other variations, modifications, and/or alternatives to those embodiments or implementations illustrated in the figures.

Application 230 is representative of one or more software elements that allow users to generate, edit, or otherwise interact with documents. Some examples of application 230 are text editors, word processing applications, spreadsheet applications, image editing and manipulation programs, and the like. In various embodiments, desktop integration framework 200 operates with configurations specific to desktop applications, such as Microsoft Office products like Microsoft Word and Microsoft Excel.

Application 230 further includes or is otherwise in communication with ADF-DI client component 240 and creates document 250. ADF-DI client component 240 is representative of one or more software elements that extend the functionality provided by web-based or other network-accessible applications to application 230. For example, ADF-DI client component 240 allows end users to avail themselves of a familiar user interface associated with application 230 to undertake information management tasks using document 250 that are normally performed by accessing server computer system 220. These tasks may be performed by or handled by web-based or other network-accessible applications hosted by server computer system 220. In various embodiments, data manipulated by such information management tasks performed in application 230 is synchronized with server computer system 220.

Document 250 is representative of one or more computer data files or units of electronic information. Document 250 may include text, images, audio, video, and other multimedia information. Document 250 may further be associated with metadata specific to application 230. Document 250 (or application 230) may provide native functionality for creating, interacting, and managing content associated with document 250. In various aspects, application 230 provides one or more interfaces for interacting with functionality of application 230 or content of document 250.

Server computer system 220 is representative of hardware and/or software elements configured to provide access to and/or host application server 260. Server computer system 220 may be embodied as local server computer system, a cloud service, and the like. Server computer system 220 may include one or more operating systems, servers, services, applications, and the like executing on one or more computers. Server computer system 220 is merely illustrative of an embodiment disclosed herein. One of ordinary skill in the art may recognize through this disclosure and the teachings presented herein other variations, modifications, and/or alternatives to those embodiments or implementations illustrated in the figures.

Application server 260 is representative of one or more software elements that allow users to interact with web-based or network-based applications. Some examples of application server 260 are either a software framework that provides a generalized approach to creating an application-server implementation, without regard to what the application functions are, or the server portion of a specific implementation instance. In various embodiments, application server 260 operates with configurations specific to Java Platform, Enterprise Edition, or Java EE that defines a core set of API and features of Java Application Servers. Application server 260 may include servlets, and JavaServer Pages, Enterprise JavaBeans, and the like. Application server 260 is merely illustrative of an embodiment disclosed herein. One of ordinary skill in the art may recognize through this disclosure and the teachings presented herein other variations, modifications, and/or alternatives to those embodiments or implementations illustrated in the figures.

ADF-DI server component 270 is representative of one or more server components, such as part of application server 260. In general, ADF-DI client component 240 acts as both view layer 110 and controller layer 120 and communicates with ADF-DI server component 270 acting in part as model layer 130 to synchronize data and execute business logic in applications hosted by application server 260 or in communication with application server 260 using ADF model 280. As discussed above, model layer 130 represents the data values related to a current view presented by ADF-DI client component 240 within application 230, along with model-level business rules, security, and application logic used against the data values. In this example, ADF-DI client component 240 and ADF-DI server component 270 allows end users to avail themselves of a familiar user interface associated with application 230 to undertake View/Controller tasks using document 250 to access ADF model 280.

In one aspect, a developer utilizes a design mode of ADF-DI client component 240 to work within application 230 to create document 250. The developer can structure and format document 250 in a desired manner utilizing native tools of application 230. The developer can also add components to document 250 using ADF-DI client component 240 to integrate document 250 with application server 260. Some examples of components or (ADFdi components) are input components (e.g., form components), output components, labels, lists, buttons, images, tables, and the like.

In various embodiments, the developer maps components that are added to document 250 to corresponding data or models associated with application server 260. The data or models can be provided by or through ADF-DI server component 270. In various embodiments, each component added to document 250 is mapped to data or an attribute of a data model exposed by model layer 130 to provide an input/output mechanism within document 250. In this example, a text box component can be added to document 250 and mapped to an attribute of ADF model 280 provided by or exposed through ADF-DI server component 270 to ADF-DI client component 240.

In one aspect, a component is a reusable entity, one having functionality that can be used by many applications or that can be used multiple times by the same application. Components can be embedded within document 250. A component generally provides one or more interfaces, such as a programming interface, a data-binding interface, or a visual interface. In one embodiment, a component having no visual representations added to document 250 is rendered or but not otherwise displayed at runtime and can provide some additional functionality. A component may have zero or more visual representations. As described further below, a component can have a visual representation driven by an underlying model.

In one aspect, a component can specify any number of views at design time, any of which can be displayed at runtime. A view assembly is the set of views that are actually displayed at runtime. The view assembly, for an application or a component, consists of views in the view composition that is selected for display at a certain point in time.

Once all desired components are included and mapped to data and/or model metadata accessible to application server 260 and ADF model 280, document 250 can be "published" or otherwise made available on application server 260. Application server 260 may provide a download link to published documents enabling users to access the documents via a browser and begin working within application 230 to view, create, and/or manipulate data, such as that stored in a database accessible to server computer system 220. In various embodiments, published documents are stored separately from the document metadata that defines components, data mappings, and any logic a developer associated with a document. In some embodiments, a published document includes all document metadata.

Figure 3:
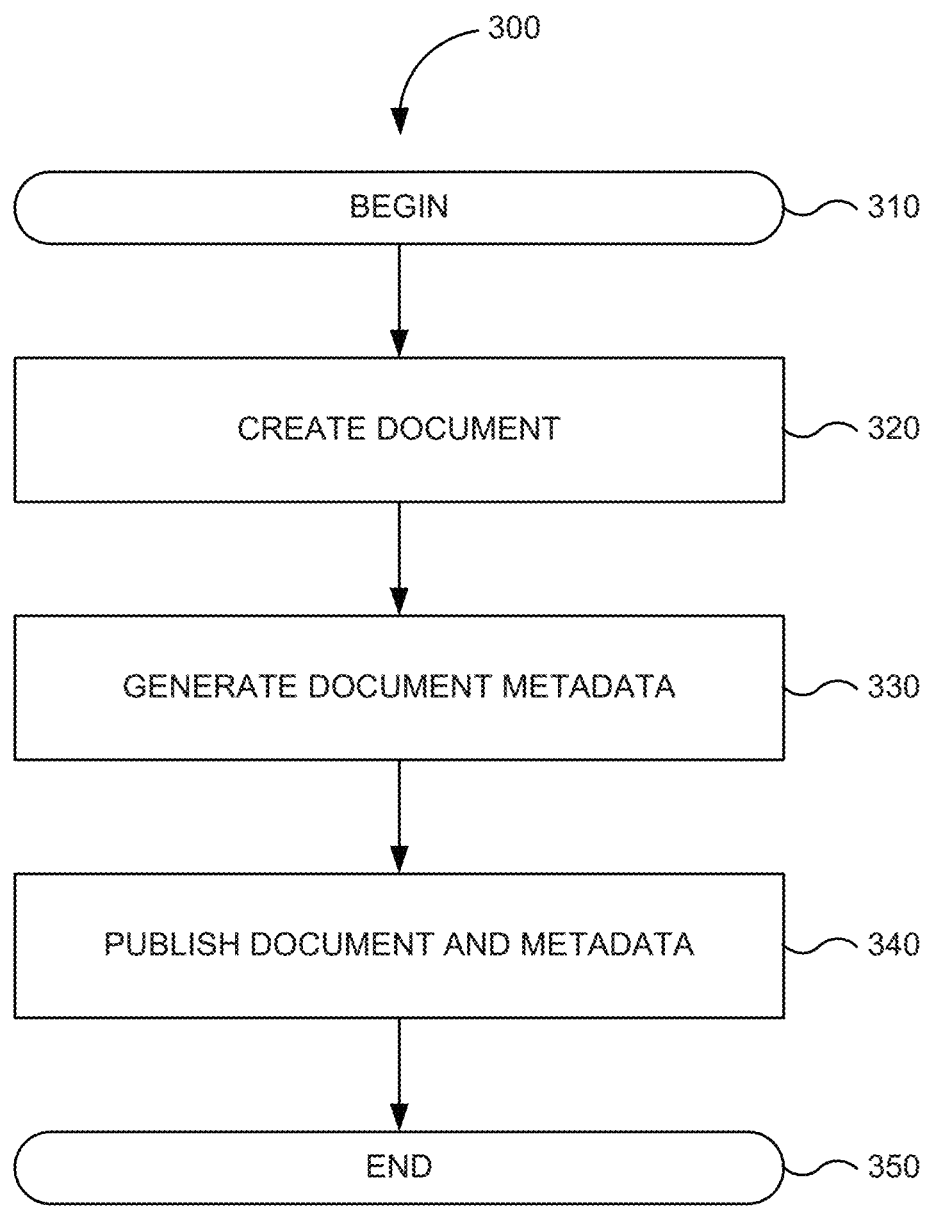
FIG. 3 is a flowchart of a method for designing a document using the desktop integration framework of FIG. 2 in one embodiment.

FIG. 3 is a flowchart of method 300 for designing a document using desktop integration framework 200 of FIG. 2 in one embodiment. Implementations or processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 300 depicted in FIG. 3 begins in step 310.

In step 320, a document is created. In various embodiments, documents are created by a user or developer by using an application (e.g., application 230 as described with respect to FIG. 2) that natively creates such documents or by using a software library that creates documents in their native format. According to FIG. 2, a user can open an existing document or create a new document in application 230. For example, the user may create a new spreadsheet in Microsoft Excel and populate the spreadsheet with various workbooks, sheets, tables, graphs, or the like. The user may edit, structure, or format the document in any desired manner using native and non-native tools.

In step 330, document metadata is generated. The document metadata includes information utilized by an integration component (e.g., ADF-DI client component 240 as described with respect to FIG. 2) of an application to render contents of an associated document such as the document created in step 320. In one aspect, the document metadata identifies each component included in the document. In another aspect, the document metadata identifies how a component is bound to specific data or to attribute metadata of one or more models (e.g., ADF model 280 as described with respect to FIG. 2). The document metadata can further provide access information, static data, other logic or data manipulation information, or references to where such may be obtained.

As discussed above with respect to FIG. 2, a developer can add components to document 250 using ADF-DI client component 240 to integrate document 250 with application server 260. In various embodiments, ADF-DI client component 240 provides an expression builder allowing a developer to specify values for one or more properties of documents or components that may be added to the documents. In one aspect, a property defines an aspect of the behavior of its corresponding component. For example, a property may specify a model or object that is mapped to the component and/or one or more attributes of the model or object corresponding to the component. In another aspect, a property may specify aspects of a document such as table column headers, worksheet ribbon commands, native document functionality, and the like.

In step 340, the document and the document metadata are published. As discussed above, published documents can be stored separately from the document metadata. In various embodiments, the document is uploaded to a web-based application and made available to users of the application. The document metadata can be uploaded to a metadata repository associated with the application. In some embodiments, a published document may include all or part of the document metadata.

In the example of FIG. 2, a published document includes at least enough metadata that enables ADF-DI client component 240 to initialize the document and request additional information from ADF-DI server component 270 to render the contents of document 250 for the user at runtime. FIG. 3 ends in step 350.

During runtime, a user downloads published document 250 and opens it with application 230. In one embodiment, ADF-DI client component 240 has been installed as an application plugin or module. ADF-DI client component 240 can then detect that document 250 has been authored to include framework components. ADF-DI client component 240 contacts ADF-DI server component 270 to request document metadata, actual data, and any logic that needs to be performed to render document 250. For example, ADF-DI client component 240 may first retrieve from or through from ADF-DI server component 270 document metadata defining which components are to be included and where to include them. ADF-DI client component 240 may retrieve from or through from ADF-DI server component 270 data from ADF model 280 for which selected components will use or otherwise operate on. ADF-DI client component 240 may further retrieve from or through from ADF-DI server component 270 any logic associated with document 250. Finally, ADF-DI client component 240 may then render contents of document 250 utilizing the document metadata, actual data, and logic.

Accordingly, a user may retrieve a document template and have the document content automatically updated and formatted based on processing performed by ADF-DI client component 240 and data obtained from application server 260. The users can then avail themselves of the familiar user interface associated with application 230 to undertake tasks using document 250.

In various aspect, as the user interacts with or manipulates document 250, ADF-DI client component 240 and ADF-DI server component 270 may remain in communication to send and receive updates accordingly. Changes made within one or more components of document 250 to data of a corresponding model in model layer 130 may be persisted in ADF model 280.

Figure 4:
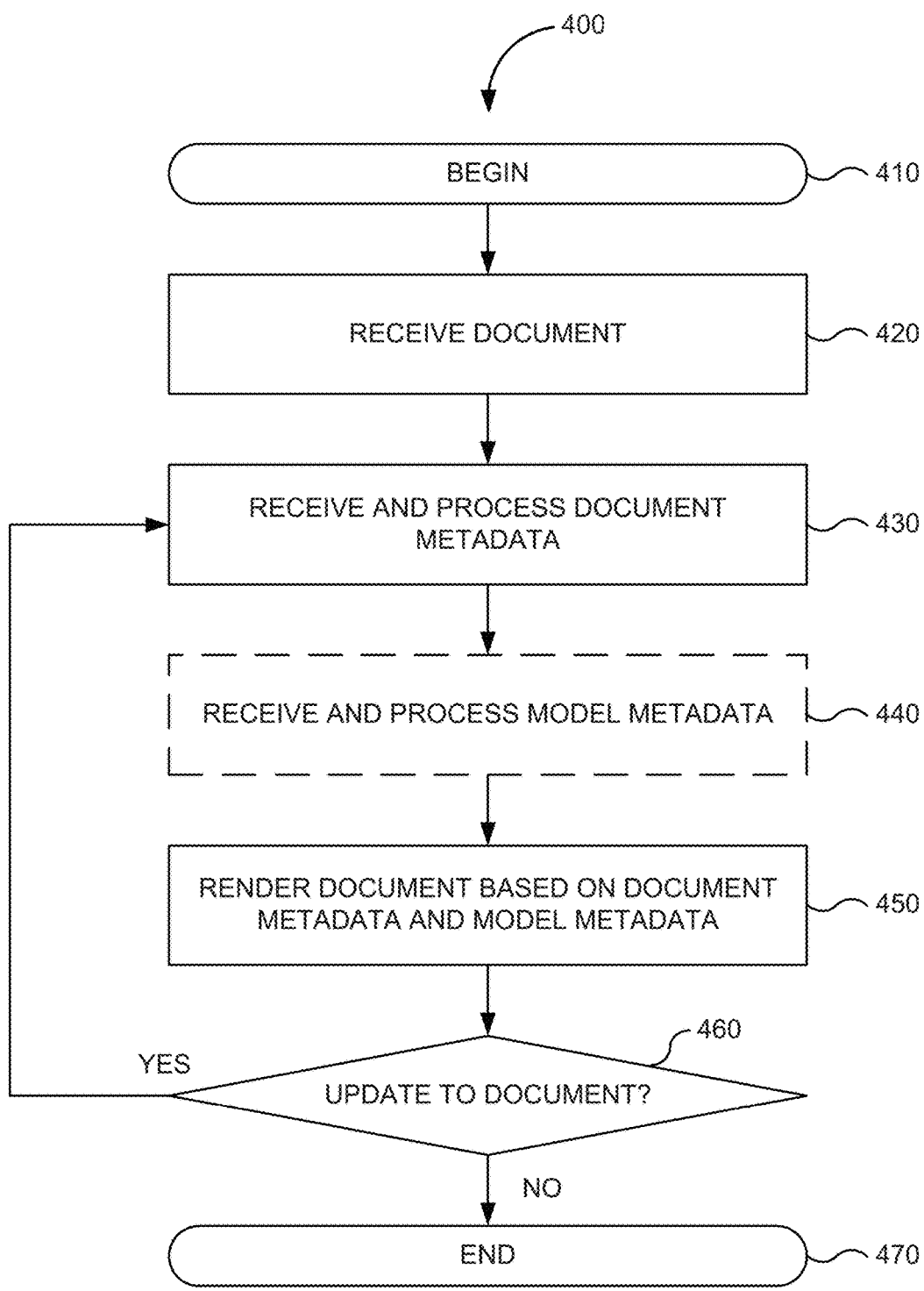
FIG. 4 is a flowchart of a method for interacting with a document using the desktop integration framework of FIG. 2 in one embodiment.

FIG. 4 is a flowchart of method 400 for interacting with a document using desktop integration framework 200 of FIG. 2 in one embodiment. Implementations or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 400 depicted in FIG. 4 begins in step 410.

In step 420, a document is received. As discussed above, documents are published enabling users to access the documents via a browser and begin working within an application (e.g., application 230). In various embodiments, a user selects a document from a web-based application to use as an interface to data provided by the web-based application. The user downloads the document to the user's computer and opens the document using its native application (e.g., application 230). An integration component of the native application or other software of the client device (e.g., ADF-DI client component 240) detects that the document is an integrated document and begins the rendering process. According to FIG. 2, a user can interact with application server 260 to retrieve a desired document, such as by clicking a document link. The document may be downloaded or otherwise communicated to client computer system 210 and opened in application 230.

In step 430, document metadata is received and processed. In various embodiments, the document metadata is received separately from the document being rendered. For example, an integration component of the native application or other software of the client device (e.g., ADF-DI client component 240) can detect that a document being opened is an integrated document and begin the rendering process by requesting appropriate document metadata. In some embodiments, all or part of the document metadata is integrated into the document being rendered. The document metadata includes information utilized by the integration component to render contents of the document. Accordingly, based on the document metadata ADF-DI client component 240 can determine which components are to be added to document 250, and a configuration of the components within document 250 such as where the components are to be placed within the document 250. ADF-DI client component 240 further determines what data or model is used by each component as well as applies any logic defined by a developer.

In optional step 440, model metadata is received and processed. In various embodiments, the model metadata is received separately from the document being rendered and the document metadata. For example, an integration component of the native application or other software of the client device (e.g., ADF-DI client component 240) can detect during the rendering process that one or more components have properties that are driven by attributes of one or more models (e.g., ADF model 280). In one aspect, the model metadata identifies how a component is bound to metadata of various models. Accordingly, based on the model metadata ADF-DI client component 240 can update or augment the document metadata associated with document 250. ADF-DI client component 240 further determines what data is referenced by or otherwise used by the metadata of the various associated models.

In step 450, the document is rendered based on the document metadata and the optional model metadata. As discussed above, ADF-DI client component 240 may retrieve from or through from ADF-DI server component 270 data from ADF model 280 for which selected components will use or otherwise operate on. ADF-DI client component 240 may further retrieve from or through from ADF-DI server component 270 any logic associated with document 250. Finally, ADF-DI client component 240 may then render contents of document 250 utilizing the document metadata, actual data, and logic.

In step 460, a determination is made whether an update to the document exists. There may be a variety of reasons why an update to the document may exist. As a user interacts with or manipulates document 250, ADF-DI client component 240 and ADF-DI server component 270 may remain in communication to send and receive updates accordingly. Changes made within one or more components of document 250 to data of a corresponding model in model layer 130 may be persisted in ADF model 280. In some embodiments, an interaction by a user may require a new dataset. As such, the flow of method 400 returns to step 430 to process any additional document data and optional model metadata. The document can then be rendered (or a portion re-rendered) in step 450. FIG. 4 ends in step 470.

Optimized Retrieval of Custom String Resources

Figure 5:
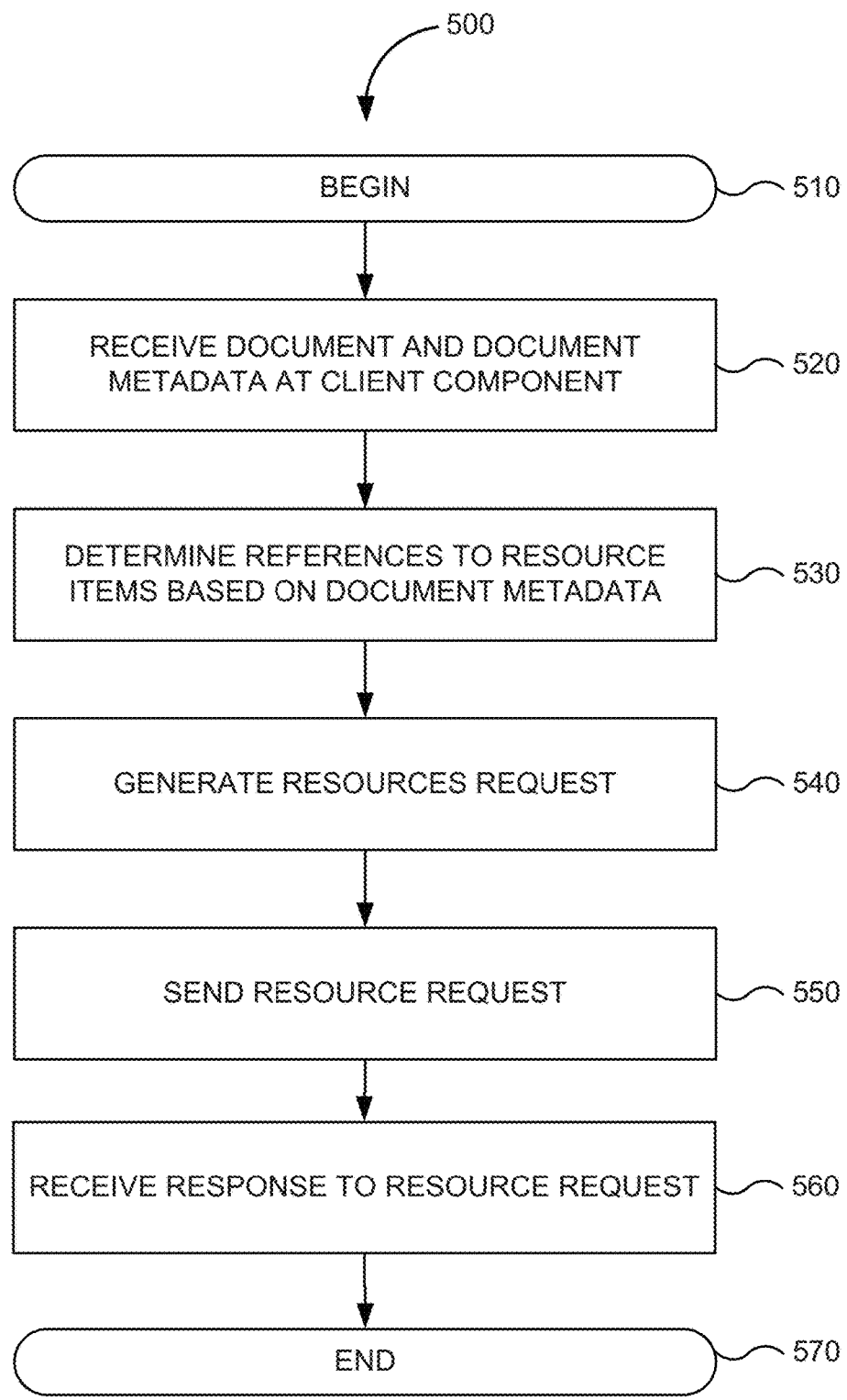
FIG. 5 is a flowchart of a method for optimizing retrieval of resource items using a client component of the desktop integration framework of FIG. 2 in one embodiment.

FIG. 5 is a flowchart of method 500 for optimizing retrieval of resource items using a client component of desktop integration framework 200 of FIG. 2 in one embodiment. Implementations or processing in method 500 depicted in FIG. 5 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 500 depicted in FIG. 5 begins in step 510.

In step 520, a document and document metadata is received at ADF-DI client component 240. As discussed above, documents are published enabling users to access the documents via a browser and begin working within an application (e.g., application 230). In various embodiments, a user selects a document from a web-based application to use as an interface to interact with data provided by the web-based application. The user downloads the document to the user's computer and opens the document using its native application. An integration component of the native application or other software of the client device (e.g., ADF-DI client component 240) detects that the document is an integrated document and begins the rendering process. According to FIG. 2, a user can interact with application server 260 to retrieve a desired document, such as by clicking a document link. The document may be downloaded or otherwise communicated to client computer system 210 and opened in application 230.

In step 530, the document and/or the document metadata is processed to determine one or more references to one or more resource items from one or more resource bundles. In various embodiments, the document metadata can include information utilized by ADF-DI client component 240 to render components of the document (e.g., interface objects downloaded into a workbook or javascript code downloaded into a web browser). For example as described herein, based on the document metadata, ADF-DI client component 240 can determine which components are to be added to the document, and what reference items (e.g., data or models)

are used by each component as well as apply any logic defined by a developer. The ADF-DI client component 240 can analyze the content of the components for one or more references to one or more resource items from one or more server-hosted resource bundles. The one or more references could take the form of string resources or programming tokens embedded into the document and/or document metadata that may be evaluated by ADF-DI client component 240 when processing the contents of the document.

In some embodiments, the document and/or the document metadata is processed to construct a data-structure representing the document metadata for the document, including one or more resource keys to the one or more resource items for the document. For example, ADF-DI client component 240 can construct a data structure containing a collection of server-hosted resource bundle identifiers (e.g., a name of the bundle) with an associated list of resource keys referenced in the content for the one or more resource items that is constructed from parsing the document and/or document metadata and identifying the string resources or embedded references.

In step 540, a resource item request is generated. In various embodiments, ADF-DI client component 240 generates a resource item request including the data structure created in step 530, which identifies the server-hosted resource bundles having one or more resource items required to process and render the document. For example, the data structure includes a map between the collection of server-hosted resource bundle identifiers and the associated list of resource keys referenced in the content for the one or more resource items. Advantageously, ADF-DI client component 240 optimizes the retrieval of the one or more resource items by creating a single request that contains the data structure representing the collection of server-hosted resource bundle identifiers and for each bundle, the associated list of resource keys for the embedded references identified in the document and/or document metadata for the one or more resource items. In some embodiments, the request can also contain a current locale in use by the client framework for further processing at the server.

In step 550, the resource item request is sent. In various embodiments, the resource item request is sent from the ADF-DI client component 240 to the ADF-DI server component 270. ADF-DI server component 270 can utilize the data structure within the request to optimally retrieve the one or more resource items from the one or more server-hosted resource bundles without retrieving all of the resources within the server-hosted resource bundles. For example, ADF-DI client component 240 can optimize retrieval of localization and internationalization information from server hosted resource bundles by including a data structure representing the set of bundle names and for each bundle, the list of resource item keys referenced in the content into a single request.

In step 560, a response to the resource item request is received. In various embodiments, the resource item request is received by the ADF-DI client component 240 from the ADF-DI server component 270. The optimized response to the resource item request may contain a single data structure or a sequence of data structures such as one per identified and requested server-hosted resource bundle, where each data structure contains a resource bundle identifier mapped to a collection of resource keys and resource items (e.g., key/value pairs). For example, the keys are the resource strings, and the values are the translated strings for each key. As such, whenever one of the resource keys (resource strings or tokens) is subsequently encountered when processing the content (e.g., in order to display content to the end-user), each key's corresponding translated string is used (e.g., displayed). FIG. 5 ends in step 570.

In additional or alternative embodiments, ADF-DI client component 240 can implement a size threshold (e.g., a data size threshold of the keys such as 5 kb, a numerical threshold of the keys such as 100 keys, or a percentage threshold of the keys such as 50% of the keys of a particular resource bundle) that once established allows ADF-DI client component 240 to determine that when the size of the keys for a particular resource bundle exceeds the size threshold, ADF-DI client component 240 can request the entire resource bundle. For example, ADF-DI client component 240 can leverage additional metadata provided by ADF-DI server component 270 when the content is downloaded (for example, the size of each bundle) to determine when to optimize resource item requests and when to request the entire bundle.

Figure 6:
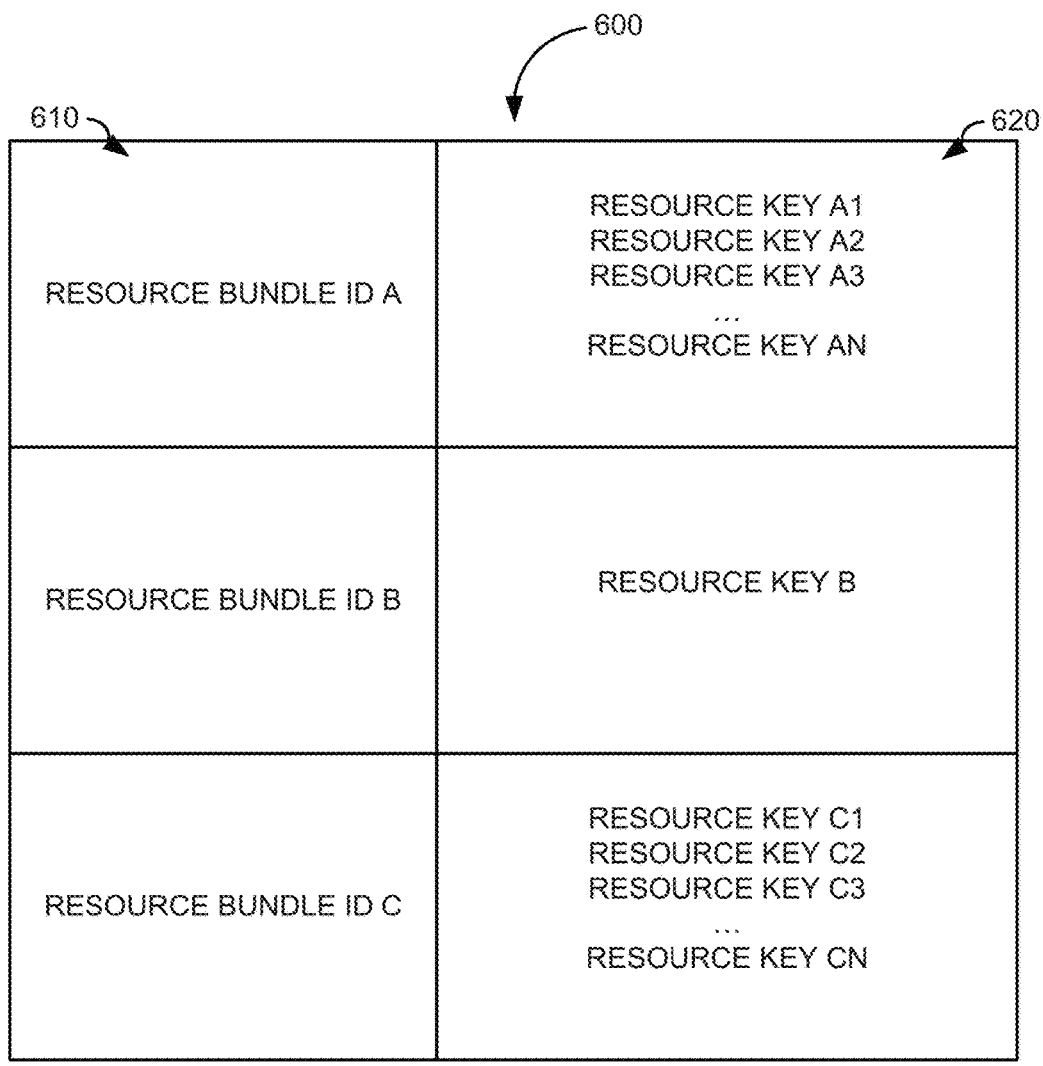
FIG. 6 is a block diagram of an optimized resource request generated by the client component of the desktop integration framework of FIG. 2 in one embodiment.

FIG. 6 is a block diagram of optimized resource request 600 generated by ADF-DI client component 240 of desktop integration framework 200 of FIG. 2 in one embodiment. Optimized resource request 600 includes section 610 referencing at least one resource bundle identifier (e.g., resource bundle ID A, resource bundle ID B, . . . , resource bundle ID C). Optimized resource request 600 also includes section 620 that, for each reference resource bundle, references a list of one or more resource item keys for the given resource bundle. Optimized resource request 600 can be processed by ADF-DI server component 270 to determine requested bundle names and for each bundle, which specific resource item keys are required.

Figure 7:
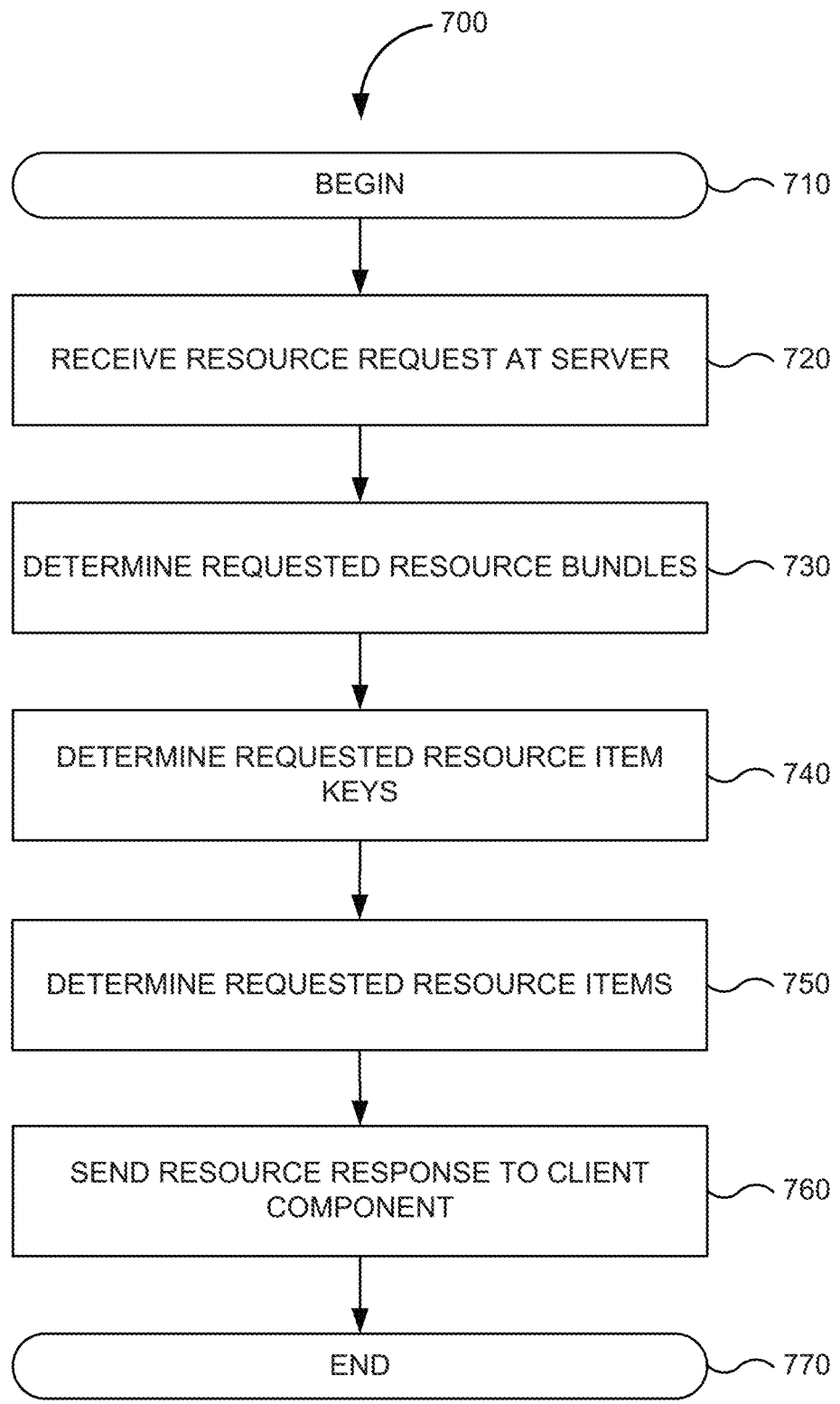
FIG. 7 is a flowchart of a method for optimizing retrieval of resource items using a server component of the desktop integration framework of FIG. 2 in one embodiment.

FIG. 7 is a flowchart of method 700 for optimizing retrieval of resource items using ADF-DI server component 270 of desktop integration framework 200 of FIG. 2 in one embodiment. Implementations or processing in method 700 depicted in FIG. 7 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 700 depicted in FIG. 7 begins in step 710.

In step 720, a resource item request is received. In various embodiments, a single resource item request is received at ADF-DI server component 270 from the ADF-DI client component 240 with a data structure that includes a set of bundle names and for each server-hosted resource bundle, the list of resource item keys referenced in the content. In step 730, one or more server-hosted resource bundles referenced in the data structure is determined. In various embodiments, ADF-DI server component 270 determines each server-hosted resource bundle referenced in the data structure received from ADF-DI client component 240. For example, ADF-DI server component 270 can parse the resource item request to determine the bundle names (e.g., an identifier or other reference to each bundle). In step 740, one or more resource item keys for the one or more server-hosted resource bundles referenced in the data structure is determined. In various embodiments, ADF-DI server component 270 determines one or more resource item keys for each server-hosted resource bundle referenced in the data structure received from ADF-DI client component 240. For example, ADF-DI server component 270 can parse the resource item request to determine the resource keys (e.g., an identifier or other reference to each requested item).

In step 750, one or more resource items in the one or more server-hosted resource bundles referenced by the one or more resource item keys is determined. In various embodiments, ADF-DI server component 270 determines one or more resource items in the one or more server-hosted resource bundles referenced by the one or more resource item keys received from ADF-DI client component 240. For example, ADF-DI server component 270 can use the one or more resource item keys to determine each of the one or more resource items identified for each of the bundles. In step 760, a resource response is generated and sent with the determined request resource items. In various embodiments, ADF-DI server component 270 generates and sends a resource response to ADF-DI client component 240 with the requested resource items. The optimized resource response may contain a single data structure or a sequence of data structures such as one per identified and requested server-hosted resource bundle, where each data structure contains a resource bundle identifier mapped to a collection of resource keys and resource items (e.g., key/value pairs). For example, the keys are the resource identifiers, and the values are the translated strings for each key. As such, whenever one of the resource keys (resource strings or tokens) is subsequently encountered when processing the content (e.g., in order to display content to the end-user), each key's corresponding translated string is used (e.g., displayed). FIG. 7 ends in step 770.

FIG. 8 is a block diagram of optimized resource response 800 generated by ADF-DI server component 270 of desktop integration framework 200 of FIG. 2 in one embodiment. Optimized resource request 800 includes section 810 referencing at least one resource bundle identifier (e.g., resource bundle ID A, resource bundle ID B, . . . , resource bundle ID N). Optimized resource request 800 also includes section 820 that, for each reference resource bundle, references at least one resource item identifier (e.g., resource key A1, resource key A2, resource key B, . . . , resource key N). Optimized resource response 800 also includes section 830 that, for each referenced resource key, provides the resource item (e.g., resource item A1, resource item A1, resource item B, . . . , resource item N).

Figure 9:
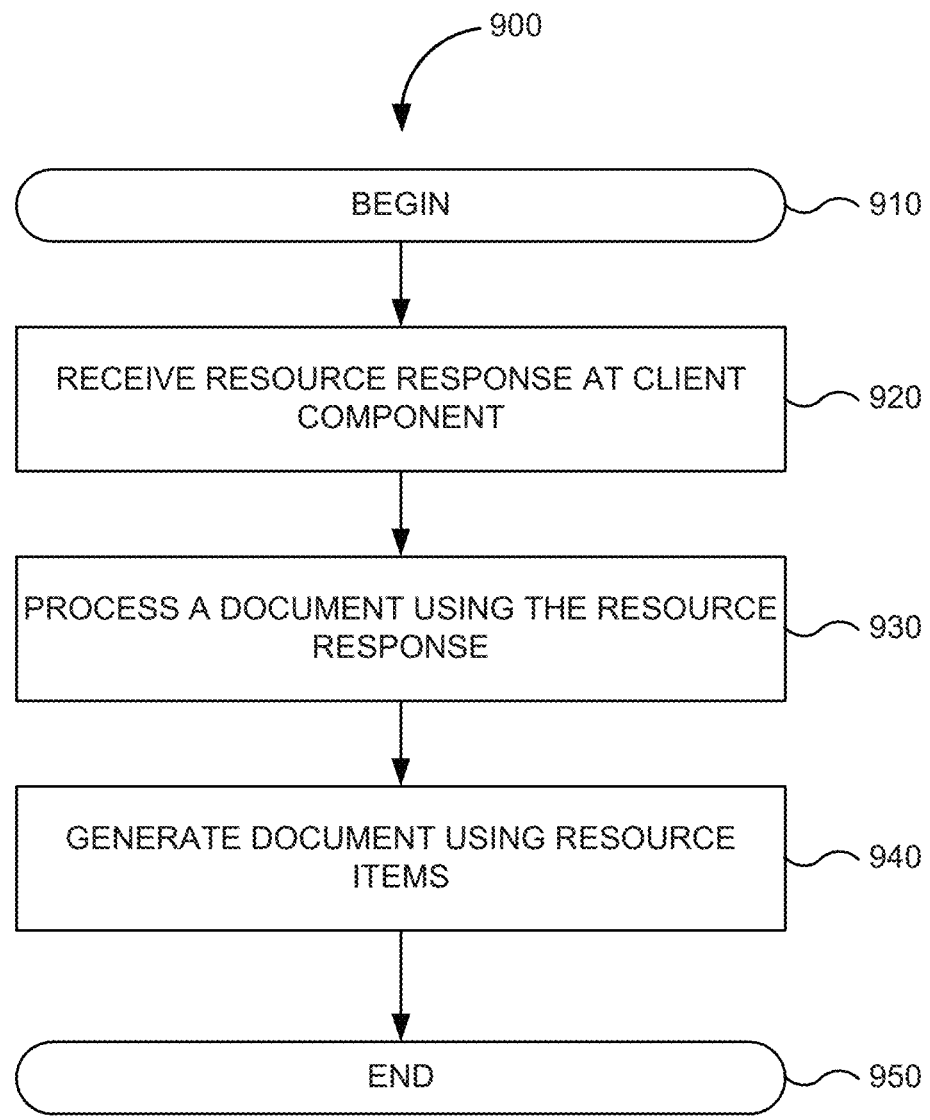
FIG. 9 is a flowchart of a method for processing a resource items response using a client component of the desktop integration framework of FIG. 2 in one embodiment.

FIG. 9 is a flowchart of method 900 for processing a resource items response using ADF-DI client component 240 of desktop integration framework 200 of FIG. 2 in one embodiment. Implementations or processing in method 900 depicted in FIG. 9 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 900 depicted in FIG. 9 begins in step 910.

In step 920, a resource response is received. In various embodiments, the resource response may be embodied as optimized resource response 800 of FIG. 8. For example, ADF-DI client component 240 can receive a resource response that includes a single data structure or a sequence of data structures such as one per server-hosted resource bundle, where each data structure contains a resource bundle identifier mapped to a collection of resource keys and resource items (e.g., key/value pairs). In step 930, a document is processed using the resource response. In various embodiments, ADF-DI client component 240 processes document 250 using the one or more resource item keys from the resource response. ADF-DI client component 240 can parse the document and/or document metadata and when encountering the resource keys (tokens), retrieve one or more of the referenced resource items using the optimized resource response. In step 940, the document can be generated using the retrieved one or more of the referenced resource items. In various embodiments, ADF-DI client component 240 can generate document 250 using the resource items received from ADF-DI server component 270. FIG. 9 ends in step 950.

Figure 10:
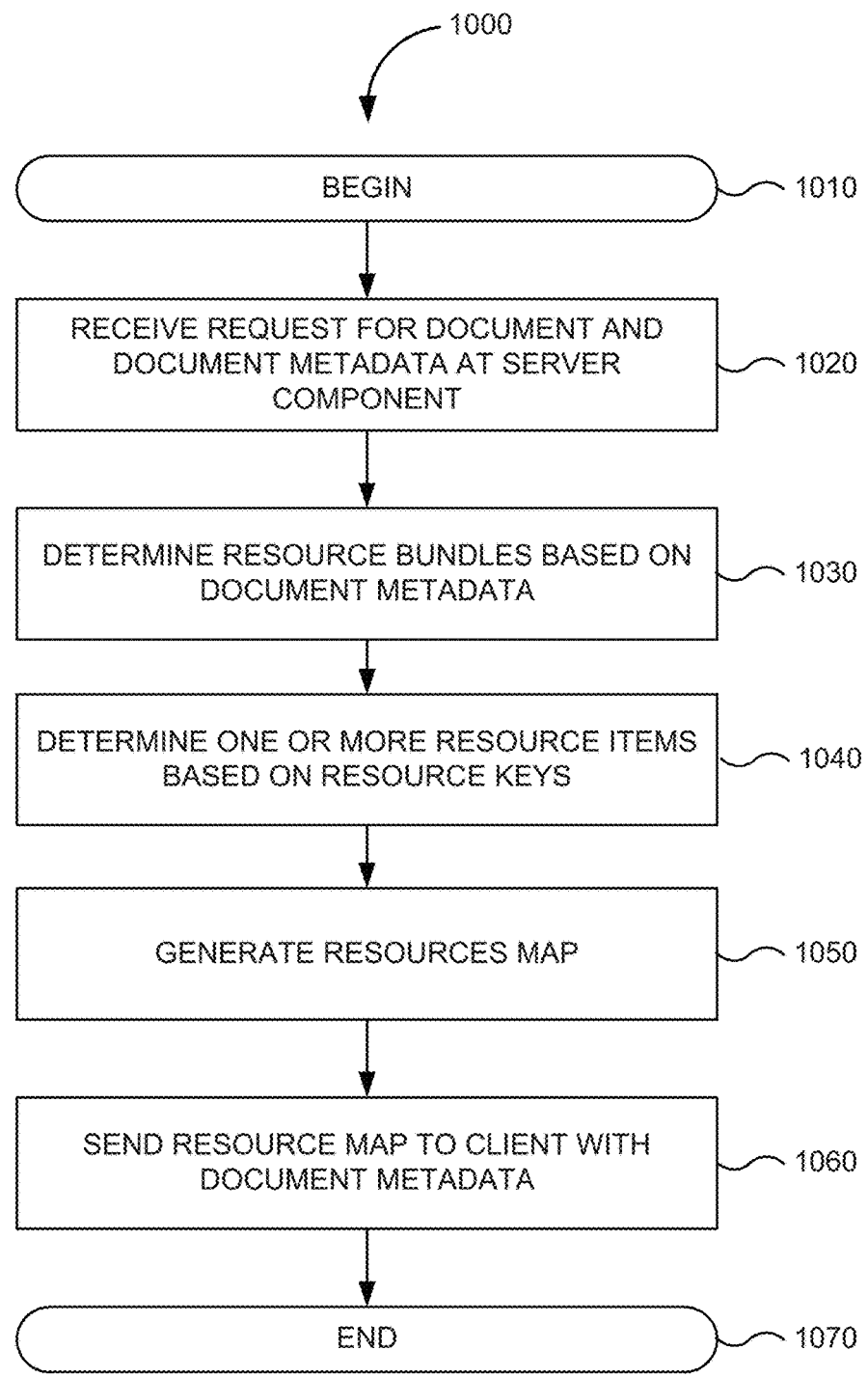
FIG. 10 is a flowchart of a method for optimizing retrieval of resource items using a server component of the desktop integration framework of FIG. 2 in one embodiment.

FIG. 10 is a flowchart of method 1000 for optimizing retrieval of resource items using ADF-DI server component 270 of desktop integration framework 200 of FIG. 2 in one embodiment. Implementations or processing in method 1000 depicted in FIG. 10 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1000 depicted in FIG. 10 begins in step 1010.

In step 1020, a request for a document and/or document metadata is received. In various embodiments, a request for a document and/or document metadata is received at ADF-DI server component 270. As discussed above, documents are published enabling users to access the documents via a browser and begin working within an application (e.g., application 230). In various embodiments, a user selects a document from a web-based application to use as an interface to interact with data provided by the web-based application. The user downloads the document to the user's computer and opens the document using its native application. An integration component of the native application or other software of the client device (e.g., ADF-DI client component 240) detects that the document is an integrated document and begins the rendering process. According to FIG. 2, a user can interact with application server 260 and ADF-DI server component 270 to retrieve a desired document, such as by clicking a document link. The document may be downloaded or otherwise communicated to client computer system 210 and opened in application 230.

In step 1030, a determination is made as to which of the one or more server-hosted resource bundles are required for processing the document by analyzing the document and/or the document metadata. The document metadata can include information utilized by ADF-DI client component 240 to render components of the document (e.g., interface objects downloaded into a workbook or javascript code downloaded into a web browser). In various embodiments, as described herein, based on the document metadata, ADF-DI server component 270 can determine which components are to be added to the document, and what reference items (e.g., data or models) are used by each component. The ADF-DI server component 270 can analyze the content of the components for one or more references to one or more resource items from the one or more server-hosted resource bundles prior to sending the document and/or document metadata to ADF DI client component 240. In alternative embodiments, based on the document metadata, ADF-DI client component 240 can determine which components are to be added to the document, and what reference items (e.g., data or models) are used by each component. The ADF-DI client component 240 can analyze the content of the components for one or more references to one or more resource items from the one or more server-hosted resource bundles after the document and/or document metadata is received from the ADF DI server component 270. The one or more references could take the form of string resources or programming tokens embedded into the document and/or document metadata that may be evaluated by ADF-DI server component 270 or the ADF-DI client component 240 when processing the contents of the document.

In step 1040, one or more resource items in the determined server-hosted resource bundles referenced by the one or more resource item keys is determined. In various embodiments, ADF-DI server component 270 determines one or more resource items in the determined server-hosted resource bundles referenced by the one or more resource item keys. For example, ADF-DI server component 270 can use the one or more resource item keys to determine each of the one or more resource items identified for each of the bundles determined in step 1030. In step 1050, a resource map is generated. In various embodiments, ADF-DI server component 270 generates a resource map with the resource items. The resource map may contain a single data structure or a sequence of data structures such as one per identified and requested server-hosted resource bundle, where each data structure contains a resource bundle identifier mapped to a collection of resource keys and resource items (e.g., key/value pairs). The resource map may be embodied as optimized resource response 800 of FIG. 8. In step 1060, ADF-DI server component 270 sends the resource map to ADF-DI client component 240 with the document and/or document metadata. FIG. 10 ends in step 1070.

System Overview

Systems depicted in some of the figures may be provided in various configurations. In some embodiments, the systems may be configured as a distributed system where one or more components of the system are distributed across one or more networks in a cloud computing system.

Figure 11:
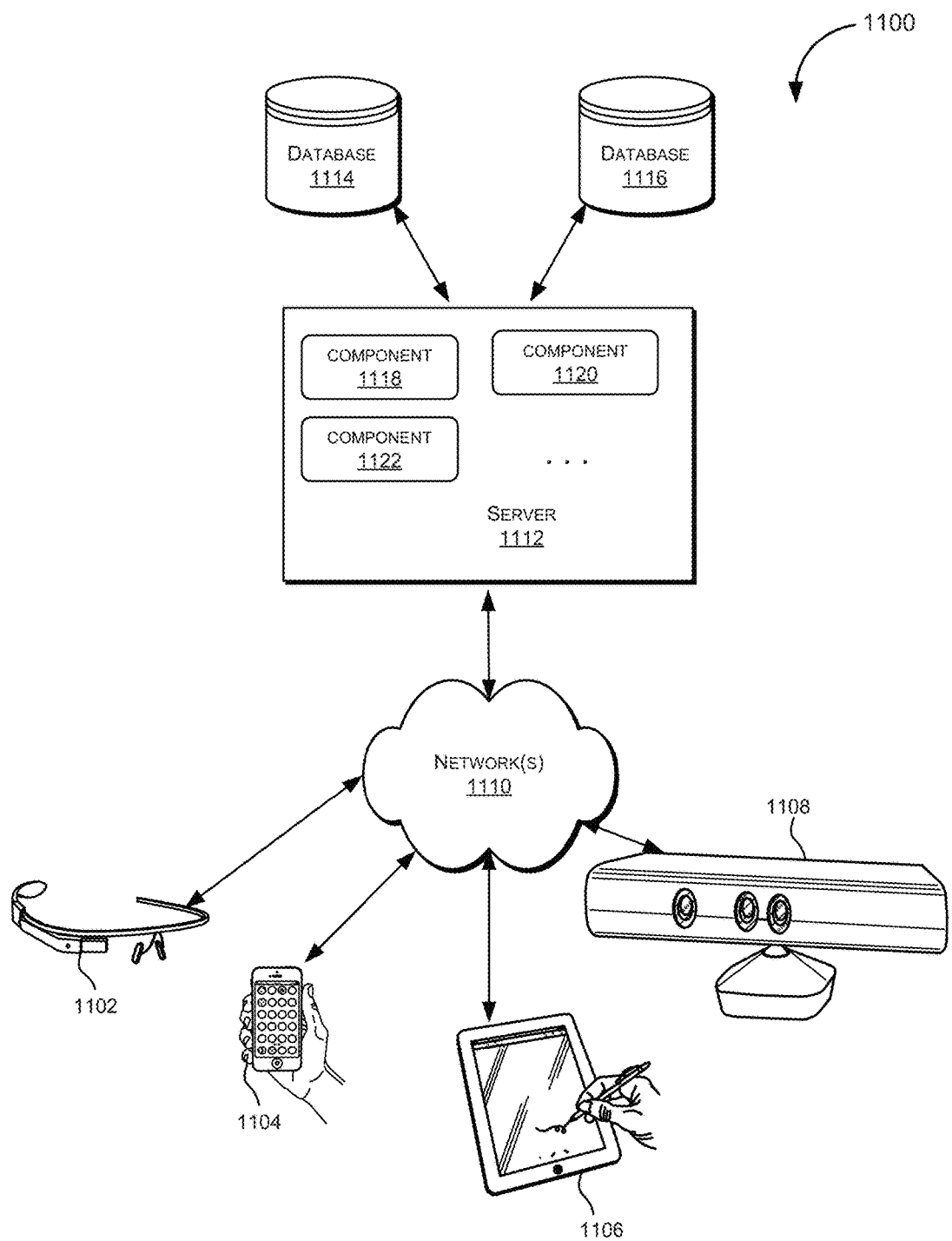
FIG. 11 depicts a simplified diagram of a distributed system for implementing one of the embodiments.

FIG. 11 depicts a simplified diagram of a distributed system 1100 for implementing one of the embodiments. In the illustrated embodiment, distributed system 1100 includes one or more client computing devices 1102, 1104, 1106, and 1108, which are configured to execute and operate a client application such as a web browser, proprietary client (e.g., Oracle Forms), or the like over one or more network(s) 1110. Server 1112 may be communicatively coupled with remote client computing devices 1102, 1104, 1106, and 1108 via network 1110.

In various embodiments, server 1112 may be adapted to run one or more services or software applications provided by one or more of the components of the system. In some embodiments, these services may be offered as web-based or cloud services or under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in the figure, the software components 1118, 1120 and 1122 of system 1100 are shown as being implemented on server 1112. In other embodiments, one or more of the components of system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The embodiment shown in the figure is thus one example of a distributed system for implementing an embodiment system and is not intended to be limiting.

Client computing devices 1102, 1104, 1106, and/or 1108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1102, 1104, 1106, and 1108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1110.

Although exemplary distributed system 1100 is shown with four client computing devices, any number of client computing devices may be supported. Other devices, such as devices with sensors, etc., may interact with server 1112.

Network(s) 1110 in distributed system 1100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1110 can be a local area network (LAN), such as one based on Ethernet, Token-Ring and/or the like. Network(s) 1110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1112 may be adapted to run one or more services or software applications described in the foregoing disclosure. For example, server 1112 may correspond to a server for performing processing described above according to an embodiment of the present disclosure.

Server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more databases 1114 and 1116. Databases 1114 and 1116 may reside in a variety of locations. By way of example, one or more of databases 1114 and 1116 may reside on a non-transitory storage medium local to (and/or resident in) server 1112. Alternatively, databases 1114 and 1116 may be remote from server 1112 and in communication with server 1112 via a network-based or dedicated connection. In one set of embodiments, databases 1114 and 1116 may reside in a storage-area network (SAN). Similarly, any necessary files for performing the functions attributed to server 1112 may be stored locally on server 1112 and/or remotely, as appropriate. In one set of embodiments, databases 1114 and 1116 may include relational databases, such as databases provided by Oracle, that are adapted to store, update, and retrieve data in response to SQL-formatted commands.

FIG. 12 illustrates an exemplary computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the various embodiments.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, various aspects of systems and processes are described with reference to specific embodiments thereof, but those skilled in the art will recognize that the systems and processes are not limited thereto. Various features and aspects of the above-described systems and processes may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Various embodiments whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments presented within this disclosure. The logic may form part of a software program or computer program product as code modules become operational with a processor of a computer system or an information-processing device when executed to perform a method or process in various embodiments presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments.

The disclosed examples, implementations, and various embodiments whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the various embodiments whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any embodiment presented within this disclosure should, therefore, be determined not with simple reference to the above description and those aspects shown in the figures, but instead should be determined with reference to the pending claims along with their full scope or equivalents.

What is claimed is:

1. A method comprising:

receiving, at a client computer having a processor and a memory, a document and document metadata specifying one or more user interface components of the document, wherein the document and document metadata are received in response to a user of the client computer selecting the document from a web-based application to use as an interface to interact with data provided by the web-based application, opening, by the processor, the document using a native application;

detecting, by an integration component of the native application or other software of the client computer, that the document is an integration document of the web-based application and performing a rendering process that comprises:

determining, by the processor, one or more resource bundles specified by the document metadata, wherein each of the one or more resource bundles comprises a plurality of resource items hosted by a server computer;

determining, by the processor, one or more resource items in each of the determined one or more resource bundles specified by the document metadata as being utilized by the client computer to render the one or more user interface components;

generating, by the processor, a request that includes a reference to each of the determined one or more resource bundles and a resource key to each of the determined one or more resource items in each of the determined one or more resource bundles, wherein the determined one or more resource items are a subset of the plurality of resource items within at least one of the determined one or more resource bundles;

sending, by the processor, the request to the server computer;

receiving, by the processor, a response to the request from the server computer that includes each of the determined one or more resource items in each of the determined resource bundles; and rendering, by the processor, the one or more user interface components using each of the one or more resource items received from the server computer, wherein the one or more resource items are used by the one or more user interface components to allow the user to interact with the data provided by the web-based application.

2. The method of claim 1, wherein the generating, by the processor, the request comprises generating a single request with a single data structure comprising each of the determined one or more resource bundles and the resource key to each of the determined one or more resource items in each of the determined one or more resource bundles.

3. The method of claim 1, further comprising determining whether a number of the determined one or more resource items in each of the determined one or more resource bundles exceeds a predetermined threshold to determine whether to request an entire resource bundle including the plurality of resource items.

4. The method of claim 1, wherein the document comprises a spreadsheet or a workbook.

5. The method of claim 1, further comprising rendering, by the processor, the document as a user interface to the web-based application using the document metadata and the one or more resource items received from the server computer.

6. The method of claim 1, wherein the determining the one or more resource bundles and the one or more resource items comprises analyzing, by the processor, content of the one or more user interface components for one or more references to the one or more resource items contained in the one or more resource bundles.

7. The method of claim 6, wherein the one or more references to the one or more resource items are string resources or programming tokens embedded into the document or the document metadata.

8. The method of claim 1, wherein the response includes a data structure for each of the determined one or more resource bundles, and each data structure includes a resource key and a corresponding resource item for each of the determined one or more resource items in the resource bundle.

9. The method of claim 8, further comprising rendering, by the processor, the document as a user interface to the web-based application using the document metadata and each resource item received from the server computer.

10. A non-transitory computer-readable medium storing program code that when executed by a processor of a client computer cause the processor to perform a method comprising:
determining, by the processor, one or more resource bundles specified by document metadata of a document comprising one or more user interface components, wherein each of the one or more resource bundles comprises a plurality of resource items hosted by a server computer;
determining, by the processor, one or more resource items in each of the determined one or more resource bundles specified by the document metadata as being utilized by the client computer to render the one or more user interface components of the document;
generating, by the processor, a request that includes a reference to each of the determined one or more resource bundles and a resource key to each of the determined one or more resource items in each of the determined one or more resource bundles, wherein the determined one or more resource items are a subset of the plurality of resource items within at least one of the determined one or more resource bundles;
sending, by the processor, the request to the server computer;

receiving, by the processor, a response to the request from the server computer that includes each of the determined one or more resource items in each of the determined resource bundles; and
rendering, by the processor, the document as a user interface to a web-based application, wherein the user interface includes the one or more user interface components, which are rendered using each of the one or more resource items received from the server computer, and wherein the one or more resource items are used by the one or more user interface components to allow a user to interact with data provided by the web-based application.

11. The non-transitory computer-readable medium of claim 10, wherein the generating the request comprises generating a single request with a single data structure comprising each of the determined one or more resource bundles and the resource key to each of the determined one or more resource items in each of the determined one or more resource bundles.

12. The non-transitory computer-readable medium of claim 10, wherein the method further comprising determining whether a number of the determined one or more resource items in each of the determined one or more resource bundles exceeds a predetermined threshold to determine whether to request the entire resource bundle including the plurality of resource items.

13. The non-transitory computer-readable medium of claim 10, wherein the document comprises a spreadsheet or a workbook.

14. The non-transitory computer-readable medium of claim 10, wherein the determining the one or more resource bundles and the one or more resource items comprises analyzing, by the processor, content of the one or more user interface components for one or more references to the one or more resource items contained in the one or more resource bundles.

15. The non-transitory computer-readable medium of claim 14, wherein the one or more references to the one or more resource items are string resources or programming tokens embedded into the document or the document metadata.

16. The non-transitory computer-readable medium of claim 10, wherein the response includes a data structure for each of the determined one or more resource bundles, and each data structure includes a resource key and a corresponding resource item for each of the determined one or more resource items in the resource bundle.

17. A method comprising:
at a server computer having a processor and a memory, the memory storing a document, document metadata specifying one or more user interface components of the document:
receiving, by the processor, a request for the document from a client computer, wherein the request is received in response to a user of the client computer selecting the document from a web-based application to use as an interface to interact with data provided by a web-based application;
determining, by processor, one or more resource bundles specified by the document metadata, wherein each of the one or more resource bundles comprises a plurality of resource items hosted by the server computer;
determining, by the processor, one or more resource items in each of the determined one or more resource bundles specified by the document metadata as being utilized by the client computer to render the one or more user interface components;

generating, by the processor, a resource map that includes a resource key and a corresponding resource item for each of the determined one or more resource items in the determined one or more resource bundles, wherein the determined one or more resource items are a subset of the plurality of resource items within at least one of the determined one or more resource bundles; and sending, by the processor, the resource map to the client computer thereby enabling the client computer to render the document as a user interface to the web-based application, wherein the user interface includes the one or more user interface components, which are rendered using the document metadata and each of the one or more resource items received from the server computer, and wherein the one or more resource items are used by the one or more user interface components to allow the user to interact with the data provided by the web-based application.

18. The method of claim 17, wherein the determining the one or more resource bundles and the one or more resource items comprises analyzing, by the processor, content of the one or more user interface components for one or more references to the one or more resource items contained in the one or more resource bundles.

* * * * *

UNITED STATES PATENT AND TRADEMARK OFFICE
CERTIFICATE OF CORRECTION

PATENT NO. : 10,048,948 B2  
APPLICATION NO. : 15/203247  
DATED : August 14, 2018  
INVENTOR(S) : Davis et al.

Page 1 of 1

It is certified that error appears in the above-identified patent and that said Letters Patent is hereby corrected as shown below:

In the Specification

In Column 6, Line 34, delete "reduced" and insert -- reduced. --, therefor.

In Column 19, Line 38, after "(e.g., resource item A1, resource item" delete "A1," and insert -- A2, --, therefor.

In Column 25, Lines 64-65, delete "electronically" and insert -- electrically --, therefor.

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*